(12) United States Patent
Taira et al.

(10) Patent No.: US 6,515,212 B2
(45) Date of Patent: Feb. 4, 2003

(54) RECORDING/REPRODUCTION SYSTEM OF MUSIC DATA, AND MUSIC DATA STORAGE MEDIUM

(75) Inventors: Kazuhiko Taira, Yokohama (JP); Hideki Mimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/944,373

(22) Filed: Sep. 4, 2001

(65) Prior Publication Data

US 2002/0069746 A1 Jun. 13, 2002

(30) Foreign Application Priority Data

Dec. 11, 2000 (JP) .................................. 2000-376401

(51) Int. Cl.$^7$ ................................................ G10H 7/00
(52) U.S. Cl. ........................................ 84/609; 709/247
(58) Field of Search .................. 84/609–614, 634–638; 709/203, 247; 375/219–223; 434/307 A

(56) References Cited

U.S. PATENT DOCUMENTS

| 5,550,863 A | * | 8/1996 | Yurt et al. ............... 375/219 X |
| 5,724,579 A |  | 3/1998 | Suzuki |
| 5,996,022 A | * | 11/1999 | Krueger et al. ............. 709/247 |

FOREIGN PATENT DOCUMENTS

| DE | 199 07 711 | 8/2000 |
| EP | 0 952 578 | 10/1999 |
| GB | 2 305 339 | 4/1997 |
| JP | 2000-187935 | 7/2000 |

* cited by examiner

Primary Examiner—Stanley J. Witkowski
(74) Attorney, Agent, or Firm—Oblon, Spivak, McClelland, Maier & Neustadt, P.C.

(57) ABSTRACT

An information medium configured to record, as a file, music contents which contain audio-compressed music data distributed from a music distribution system. In the system, music data obtained by transcoding the audio-compressed music data, and the original compressed audio data, can be stored in a single file. The system can store information for applying a usage rule having the same contents as a contents usage rule appended to the music contents to the transcoded music data.

18 Claims, 20 Drawing Sheets

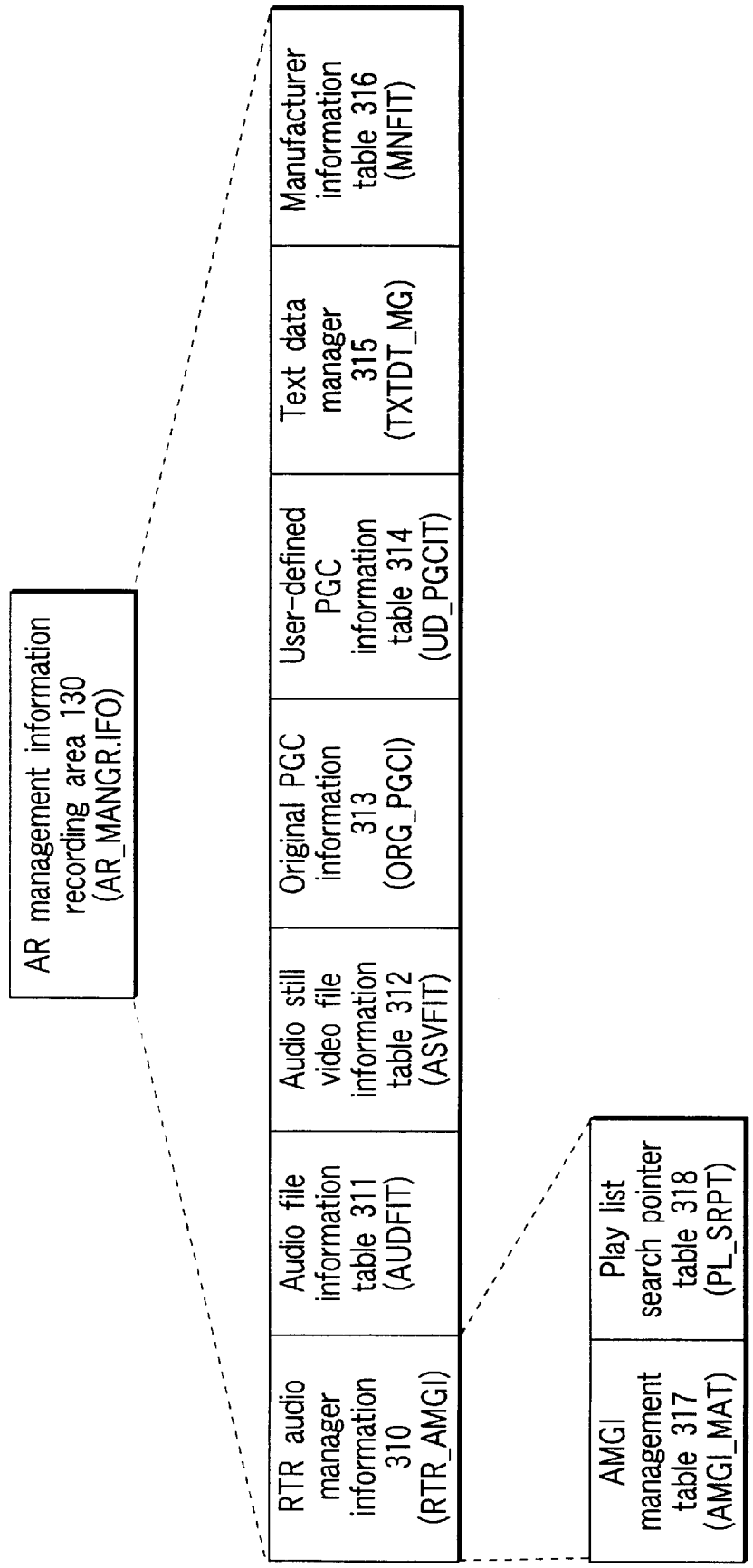
F I G. 4

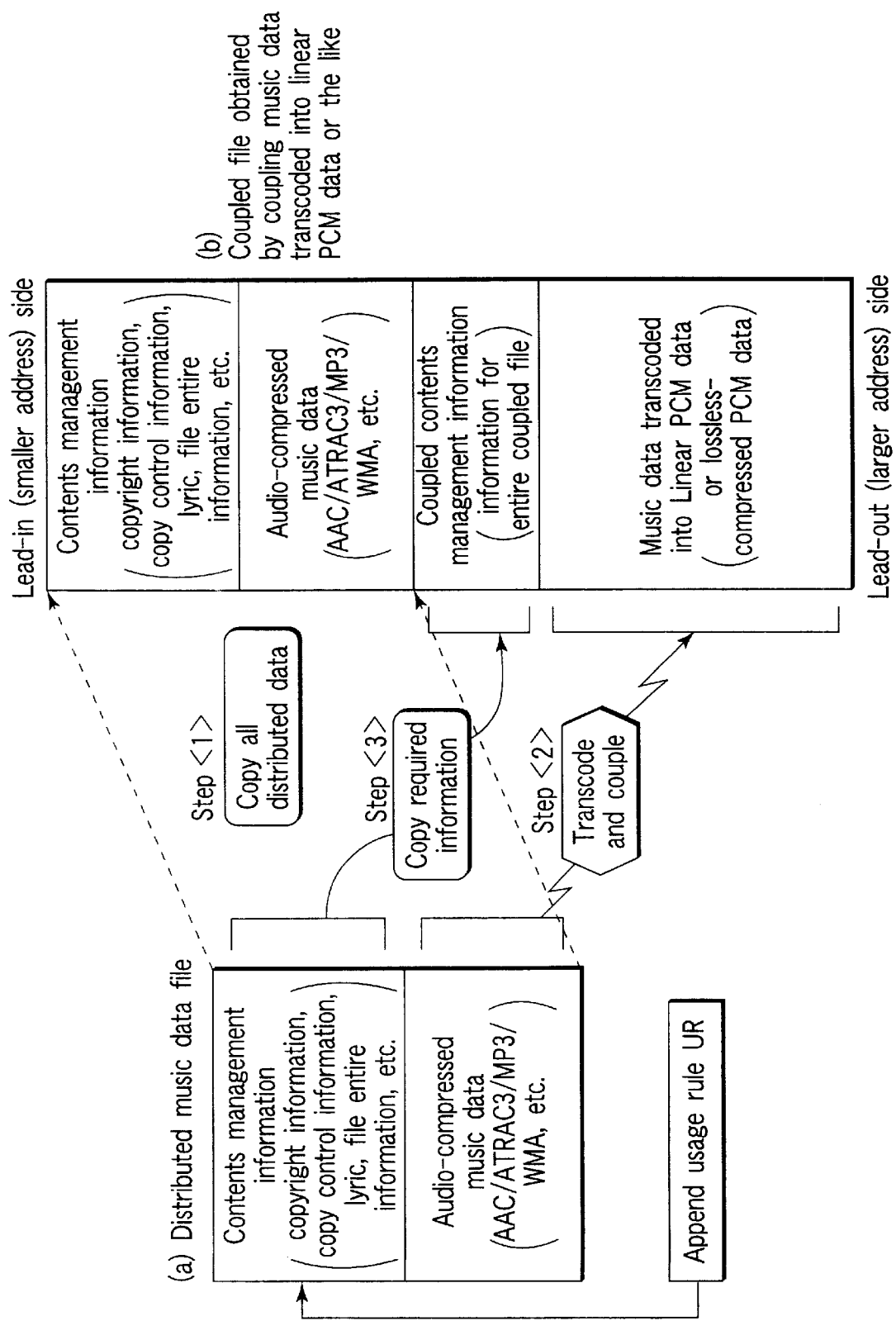
F I G. 11

FIG. 13

PGC information (PGCI) 400

- PGC general information 410 (PGC_GI)
- Program information #1 (PGI #1) 420
- ...
- Program information #m (PGI #m) 420
- Cell information search pointer #1 (CI_SRP #1) 430
- ...
- Cell information search pointer #n (CI_SRP #n) 430
- Cell information #1 (CI #1) 440
- ...
- Cell information #n (CI #n) 440

PGC general information 410 (PGC_GI):
- Number of programs PG (PG_Ns) 411
- Number of "CI_SRP"s (CI_SRP_Ns) 412
- EMD file link information (LNKIa) 413

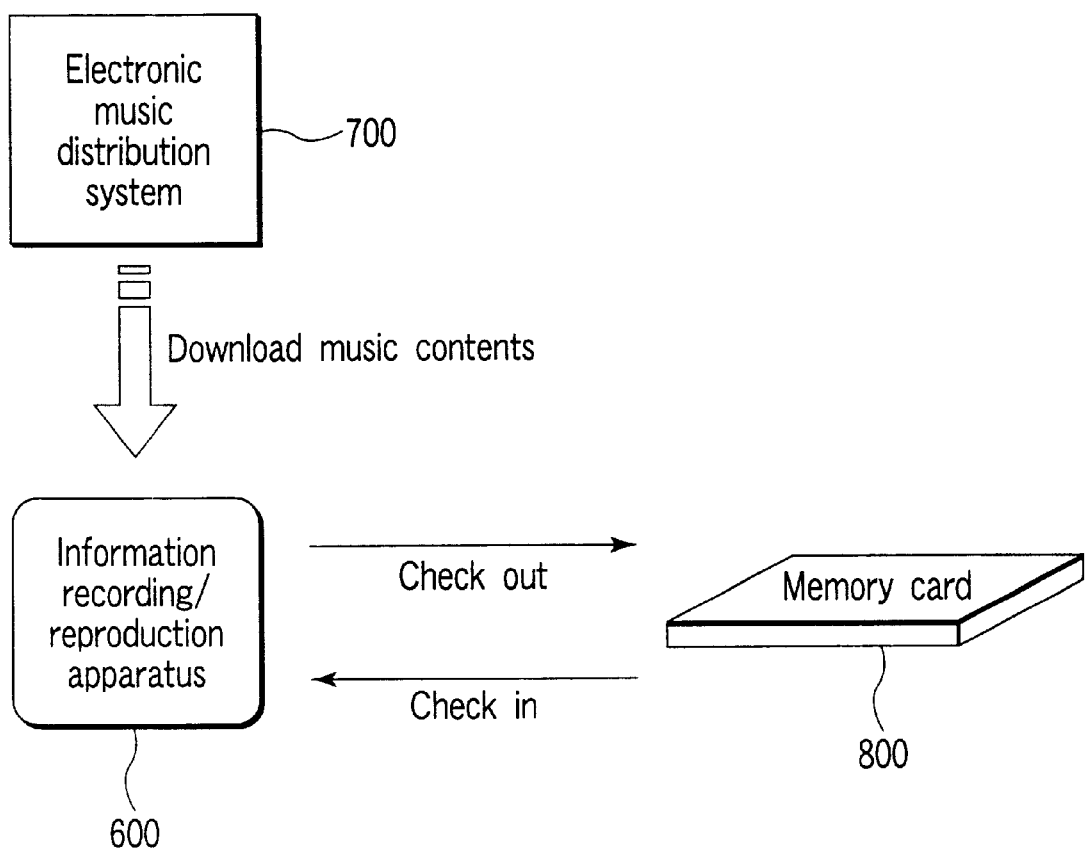
F I G. 20

RECORDING/REPRODUCTION SYSTEM OF MUSIC DATA, AND MUSIC DATA STORAGE MEDIUM

CROSS-REFERENCE TO RELATED APPLICATIONS

This application is based upon and claims the benefit of priority from the prior Japanese Patent Application No. 2000-376401, filed Dec. 11, 2000, the entire contents of which are incorporated herein by reference.

BACKGROUND OF THE INVENTION

The present invention relates to a recording method/apparatus and reproduction method/apparatus for recording/reproducing music contents distributed from an EMD (Electronic Music Distribution) system on/from an information storage medium.

The DVD video recording (DVD-VR) standards issued by the DVD Forum in September of 1999 are application standards for DVD recording using DVD-RAM (rewritable) discs or DVD-RW (re-recordable) discs that allow recording/reproduction. As the application standards for DVD recording, DVD audio recording (DVD-AR) standards are about to hatch in addition to the DVD-VR standards.

In DVD-VR standards, one audio coding of linear PCM, DOLBY DIGITAL (AC-3), and MPEG is recorded on a disc, and a reproduction apparatus equips a decoder for the audio coding to assure compatibility among reproduction apparatuses. Likewise, in the DVD-AR standards, assuring compatibility among reproduction apparatuses is one of the important concepts, and linear PCM is going to be adopted to achieve that object. Furthermore, to cope with the extended recording time of high-bit, high-sampling multi-channel audio data with high audio quality, the introduction of lossless compression PCM (packed PCM) has been examined.

In recent years, some EMD services have started, and demand for recording distributed music contents on a DVD-RAM disc, DVD-RW disc, and the like compatible to the DVD-AR standards is increasing.

However, music contents distributed by a plurality of EMD systems (Electronic Music. Distribution systems) adopt various audio compression schemes: MPEG-2.AAC (Advanced Audio Coding), ATRAC3 (Adaptive TRansform Acoustic Coding 3), MP3 (MPEG-1. Audio Layer 3), MS audio (WMA: Windows Media Audio), TwinVQ (Transform-Domain Weighted Interleave Vector Quantization), Q design, MP4, and the like.

It is possible to record these music contents distributed from the EMD systems on a DVD-RAM disc, DVD-RW disc, and the like as data files corresponding to individual EMD systems independently of the DVD-AR standards. However, the music contents stored in this way can be reproduced only by reproduction apparatuses compatible with the individual EMD systems (individual audio compression schemes), and cannot always be reproduced by all the reproduction apparatuses. Hence, reproduction compatibility cannot be assured.

It is not practical as a business undertaking to make each reproduction apparatus support all audio compression schemes since the apparatus load is so heavy (this leads to a high product cost). Furthermore, the number and kinds of compression schemes to be supported are design matters of individual reproduction apparatuses and/or recording apparatuses. In addition, once new audio compression schemes will appear in the future, compatibility is naturally lost.

BRIEF SUMMARY OF THE INVENTION

A system according to an aspect of the present invention may use an information medium which can record compressed music data (music data compressed by AAC, ATRAC3, MP3, WMA, and the like) distributed from a music distribution system. Music data (music data of linear PCM or lossless compression PCM) transcoded based on the audio-compressed music data, and source compressed music data (music data compressed by AAC, ATRAC3, MP3, WMA, and the like) can be stored in a single file (an AR_EMD**.ARO file or a coupled file group). Also, information for applying usage rules having the same contents as contents usage rules (UR) appended to the music contents to the transcoded audio data can be stored.

The points of an embodiment-of the present invention can be summarized as follows. That is, audio-compressed music data distributed from the music distribution system may be "transcoded into data such as linear PCM data that can assure compatibility". After that, the "transcoded data" may be combined to "original data" containing copyright management information and/or copy control information distributed together with music data, and may be stored in the information medium as a "music distribution compatible DVD coupled file".

Also, "link information" to the "music distribution compatible DVD coupled file" may be recorded in program chain reproduction control information of the DVD audio recording (DVD-AR) standards.

Coupled contents management information that manages all data in the "coupled file" may be read out, and the reproduction apparatus may select and reproduce one of the audio-compressed data or linear PCM (or lossless-compressed, packed PCM) data.

Furthermore, move/copy/deletion, and the like of the generated coupled file may be controlled on the basis of the distributed copyright management information and/or copy control information.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view for explaining an example of the internal data structure of an AR management information recording area (corresponding to, an AR_MANGR.IFO file shown in FIG. 2 or 3) for audio recording standards, music data and the like) are stored in an information storage medium (optical disc, memory card, or the like);

FIG. 11 is a chart for explaining another example of the way distributed music contents (audio-compressed music data and the like) are stored in an information storage medium (optical disc, memory card, or the like);

FIG. 13 is a view for explaining an example of the data structure upon storing the link information to the coupled file in PGC general information in FIG. 12(a);

FIG. 20 is a diagram for explaining a system in which music contents are downloaded from EMD system 700 having an arrangement shown in FIG. 9 to an optical disc (information storage medium) 100 shown in FIG. 1 by information recording/reproduc-tion apparatus 600 shown in FIG. 8, and which can move (check out) the downloaded music contents to memory card (another information storage medium) 800, or can return (check in) the music contents from memory card 800 to original optical disc 100.

DETAILED DESCRIPTION OF THE INVENTION

A music data recording/reproduction system and music data storage medium according to an embodiment of the present invention will be:described hereinafter with reference to the accompanying drawings.

Figure 1:
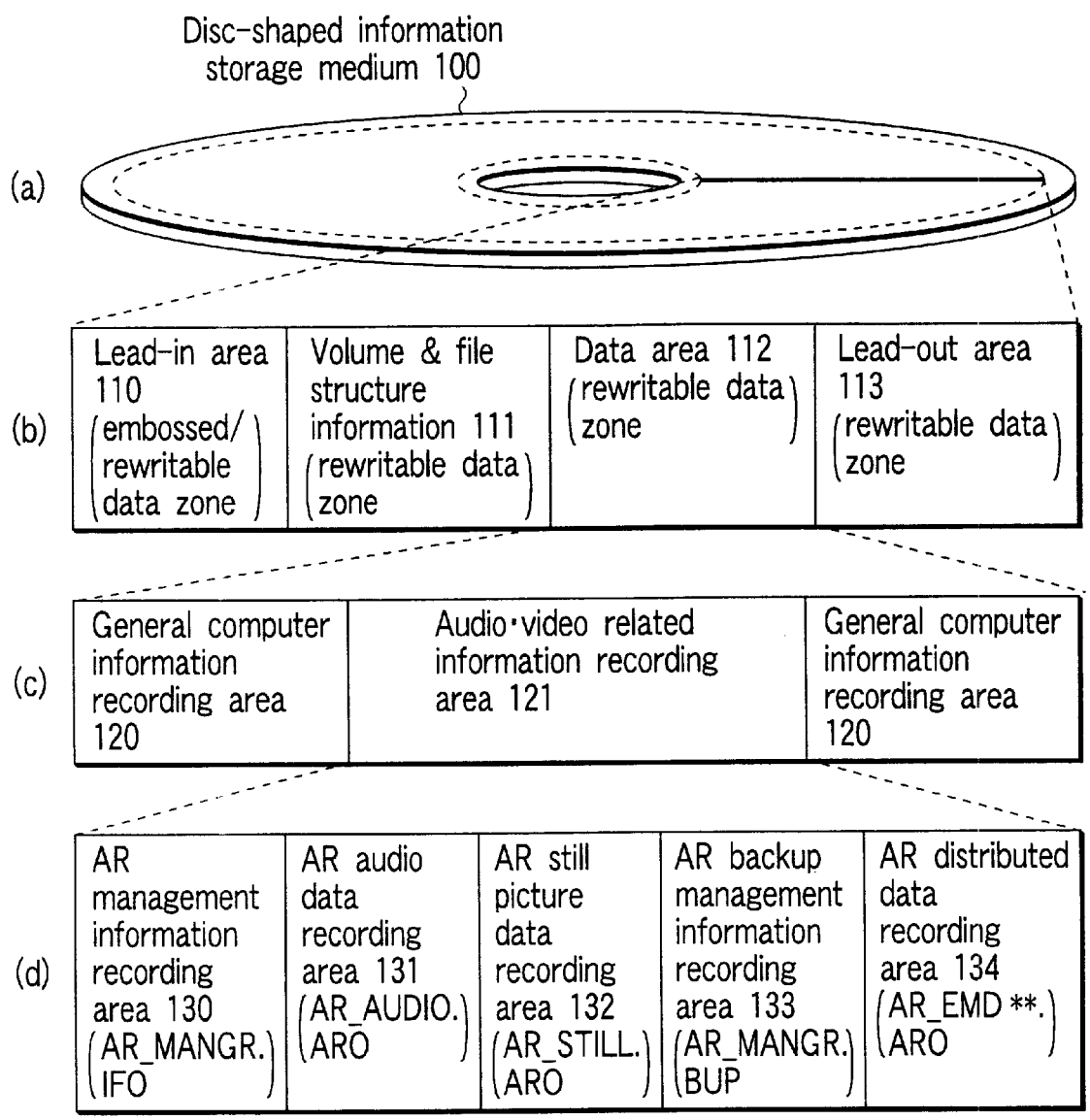
FIG. 1 is a view for explaining an example of the data structure used in an information storage medium (recordable/reproducible discs such as DVD-RAM, DVD-RW, DVD-R, and the like) that can be used in a music data recording/reproduction system according to an embodiment of the present invention.

FIG. 1 is a view for explaining an example of the data structure used in an information storage medium (recordable/reproducible discs such as DVD-RAM, DVD-RW, DVD-R, and the like) that can be used in a music data recording/reproduction system according to an embodiment of the present invention.

Rewritable, disk-shaped information storage medium (DVD-RAM disc, DVD-RW disc, or the like) 100 shown in FIG. 1(a) has lead-in area 110, volume & file structure information 111, data area 112, and lead-out area 113, as shown in FIG. 1(b). Data area 112 shown in FIG. 1(b) has a format that allows storage of general computer information recording areas 120 and audio.video related information recording area 121 together, as shown in FIG. 1(c). Audio-.video related information recording area 121 in FIG. 1(c) can record contents information of the DVD-AR (audio recording) standards.

Audio.video related information recording area 121 can record AR audio data recording area (AR_AUDIO.ARO) 131 for storing audio contents information specified by the DVD-AR standards, AR still picture data recording area (AR_STILL.ARO) 132 for storing still picture contents information specified by the DVD-AR standards, AR management information recording area (AR_MANGR.IFO) 130 for managing reproduction objects of information stored in AR audio data recording area 131 and AR still picture data recording area 132, AR backup management information recording area (AR_MANGR.BUP) 133 for storing backup management information having the same contents as in AR management information recording area 130, and AR distributed data recording area 134 (AR_EMD**.ARO) for storing music contents distributed by EMD systems, as shown in FIG. 1(d).

Figure 2:
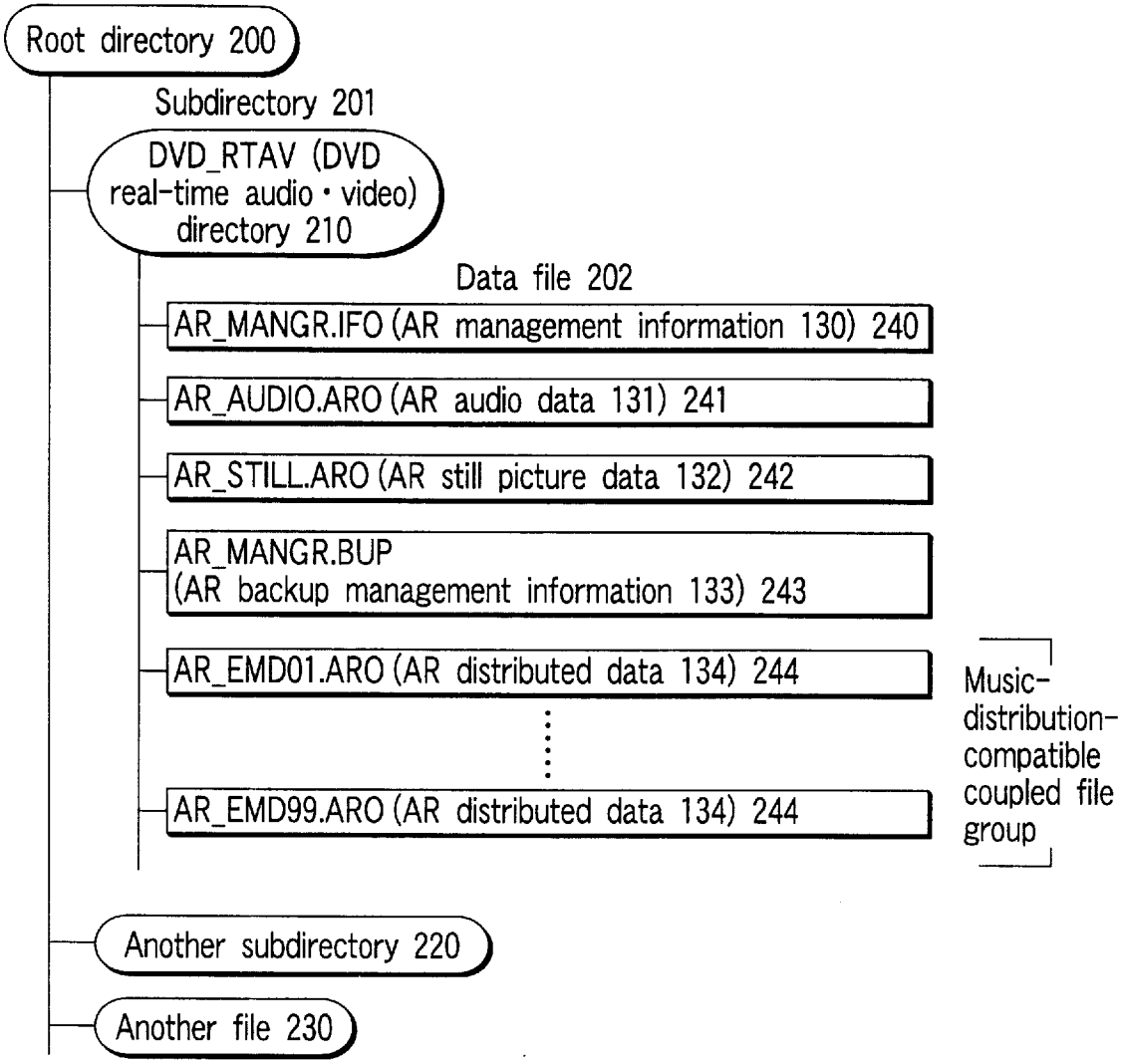
FIG. 2 shows an example of the directory structure (example 1) of files, which is recorded in volume & file structure information on the information storage medium shown in FIG. 1, and is specified by the DVD recording standards based on the present invention.

FIG. 2 shows an example of the directory structure (example 1) of files, which is recorded in volume & file structure information on the information storage medium shown in FIG. 1, and is specified by the DVD-AR standards based on the present invention.

Referring to FIG. 2, DVD_RTAV directory 210 that stores file groups specified by the DVD-AR standards used in the present invention, other subdirectories 220 indicating other directories, and other files 230 indicating other files can be allocated under root directory 200, as indicated by subdirectories 201.

Under DVD_RTAV directory 210, file groups 240 to 243 (information/data in areas 130 to 133 in FIG. 1(d)) complying with the DVD-AR standards are stored, and music distribution compatible coupled file groups (data in area 134 in FIG. 1(d)) 244 used in the present invention are stored in the same manner as those files, as indicated by data files 202.

Figure 3:
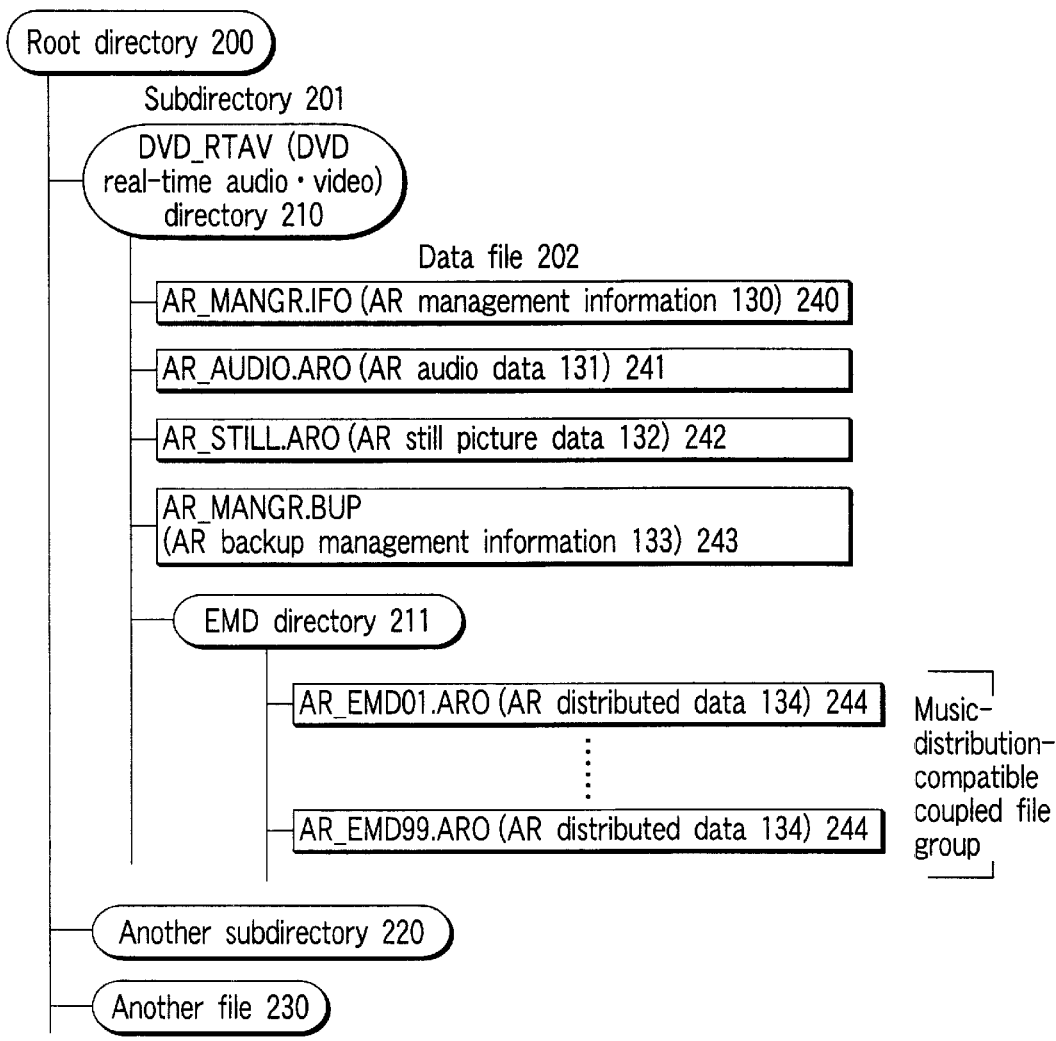
FIG. 3 shows an example of the directory structure (example 2) of files, which is recorded in volume & file structure information on the information storage medium shown in FIG. 1, and is specified by the DVD recording standards based on the present invention.

FIG. 3 shows an example of the directory structure (example 2) of files, which is recorded in volume & file structure information on the information storage medium shown in FIG. 1, and is specified by the DVD-AR standards based on the present invention.

Referring to FIG. 3, EMD directory 211 as a directory for music distribution is allocated under DVD_RTAV directory 210. This EMD directory 21 stores music distribution compatible coupled file groups (data in area 134 in FIG. 1(d)) 244.

FIG. 4 is a view for explaining an example of the internal data structure of an AR management information recording area (corresponding to an AR_MANGR.IFO file shown in FIG. 2 or 3) for the DVD-AR standards, which is recorded in the audio.video related information recording area on the information storage medium shown in FIG. 1. FIG. 4 shows an example of management information stored in file AR_MANGR.IFO 240 recorded in AR management information recording area (AR_MANGR.IFO) 130 (FIG. 1(d)) or its backup file AR_MANGR.BUP 243 (FIG. 2 or 3).

Referring to FIG. 4, RTR audio manager information (RTR_AMGI) 310 is an information area for managing the entire AR management information stored in AR_MANGR.IFO 240. This RTR_AMGI 310 contains AMGI management table (AMGI_MAT) 317 and play list search pointer table (PL_SRPT) 318. Audio file information table (AUDFIT) 311 is an information area for managing AR audio data stored in file AR_AUDIO.ARO 241. Audio still video file information table (ASVFIT) 312 is an information area for managing AR still picture data stored in file AR_STILL.ARO 242. Original PGC information (ORG_PGCI) 313 is a reproduction control information area that contains a reproduction order of all AR audio data and still picture data recorded. User-defined PGC information table (UD_PGCIT) 314 is a reproduction control information area that specifies a reproduction order by freely combining bars of a user's choice. Text data manager (TXTDT_MG) 315 is a text information area that pertains to recorded contents. Manufacturer information table (MNFIT) 316 is an information area where manufacturer unique information can be freely recorded.

Management information (AR_MANGR.IFO) 130 in FIG. 4 has original PGC information 313, user-defined PGC information 314, and play list search pointer table 318 as reproduction control information used to reproduce contents information specified by the DVD-AR standards. Reproduction control information stored in each of the original PGC information 313 and user-defined PGC information 314 has a data structure of a PGC as a basic unit of reproduction control (see FIG. 5).

Figure 5:
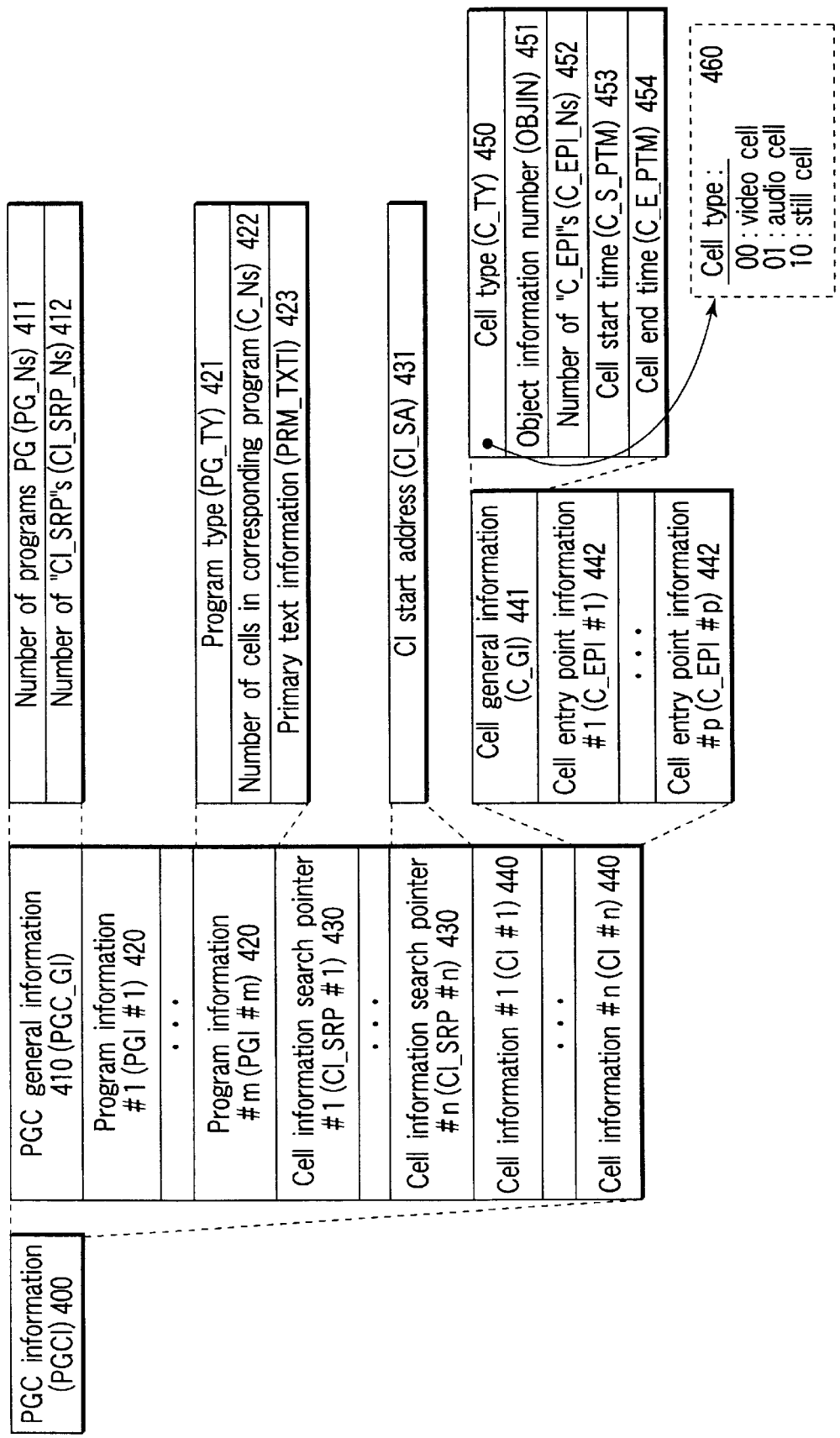
FIG. 5 is a view for explaining an example of the internal data structure of program chain information (PGCI) as a basic unit of contents reproduction control.

FIG. 5 is a view for explaining an example of the internal data structure of program chain information (PGCI) as a basic unit of contents reproduction control in the DVD-AR standards. Information indicating a reproduction sequence of contents information is recorded in program chain (PGC) information 400. Note that a minimum basic unit of contents information to be seamlessly reproduced is called a "cell", and a sequence of "cells" forms a PGC as the reproduction sequence.

PGC information 400 is comprised of PGC general information (PGC_GI) 410 containing number of programs (PG_Ns) 411 and number of cells (number of search pointers CI_SRP_Ns of cell information) 412 contained in that PGC, a plurality of pieces of program information (PGI#1 to PGI#m) 420 each containing program type (PG_TY) 421, number of cells (C_Ns) 422 contained in a program, and primary text information (PRM_TXTI) 423, cell information search pointers (CI_SRP#1 to CI_SRP#n) 430 each containing CI start address (CI_SA) 431 indicating the start position of cell information CI, and a plurality of pieces of cell information (CI#1 to CI#n) 440 as reproduction information indicating the reproduction periods of contents information.

However, user-defined PGC information 314 is comprised of only cell information 440 as reproduction information indicating a reproduction periods of contents information, and a group of a plurality of pieces of cell information 440 indicating their reproduction order, but does not contain any program information 420.

Each cell information (CI#) 440 contains cell general information (C_GI) 441 as information that pertains to the entire cell information, and a plurality of pieces of cell entry point information (C_EPI#1 to C_EPI#p) 442 each indicating a reproduction cell entry point in a cell.

Cell general information (C_GI) 441 contains cell type (C_TY) 450 as information indicating contents type 460 (a flag indicating a video cell, audio cell, or still picture cell) of a cell to be reproduced, object information number (OBJIN) 451 of contents information to be actually reproduced, number of entry points (C_EPI_Ns) 452 contained in a cell, cell start time (or start position) (C_S_PTM) 453, and cell end time (or end position) (C_E_PTM) 454.

Figure 6:
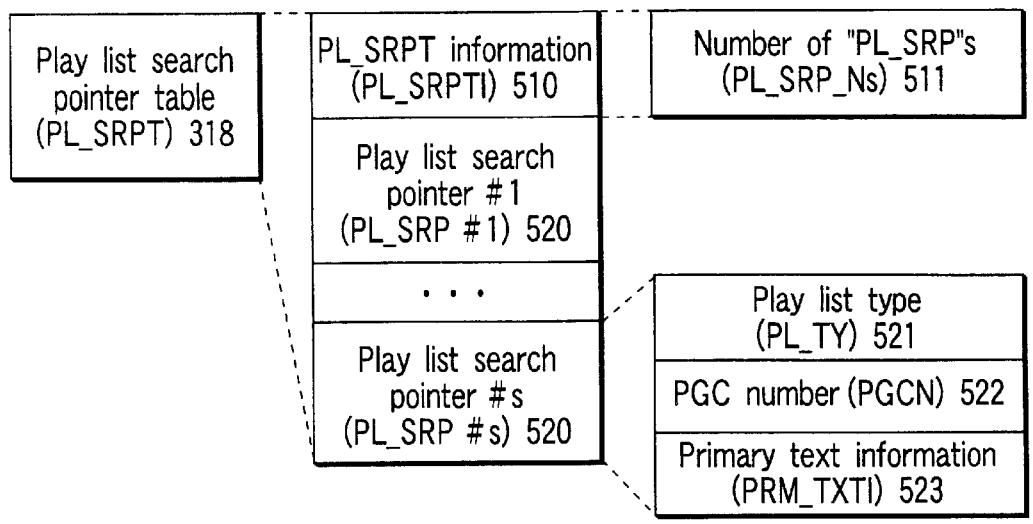
FIG. 6 is a view for explaining an example of the internal data structure of a play list search pointer table (PL_SRPT) as contents reproduction control information.

FIG. 6 is a view for explaining an example of the internal data structure of the play list search pointer table (PL_SRPT) as contents reproduction control information in the DVD-AR standards.

As shown in FIG. 6, play list search pointer table 318 contains play list search pointer table information (PL_SRPTI) 510, and one or more play list search pointers (PL_SRP#1 to PL_SRP#s) 520. Note that PL_SRPTI 510 has PL_SRP_Ns 511 indicating the number of play lists that the user can select to reproduce. Each PL_SRP 520 has play list type (PL_TY) 521 indicating contents information (video/audio/still picture/hybrid) of each play list, PGC number (PGCN) 522 of user-defined PGC information 560 contained in user-defined PGC information table 530 reproduced by each play list, and primary text information (PRM_TXTI) 523 that pertains to each play list.

Figure 7:
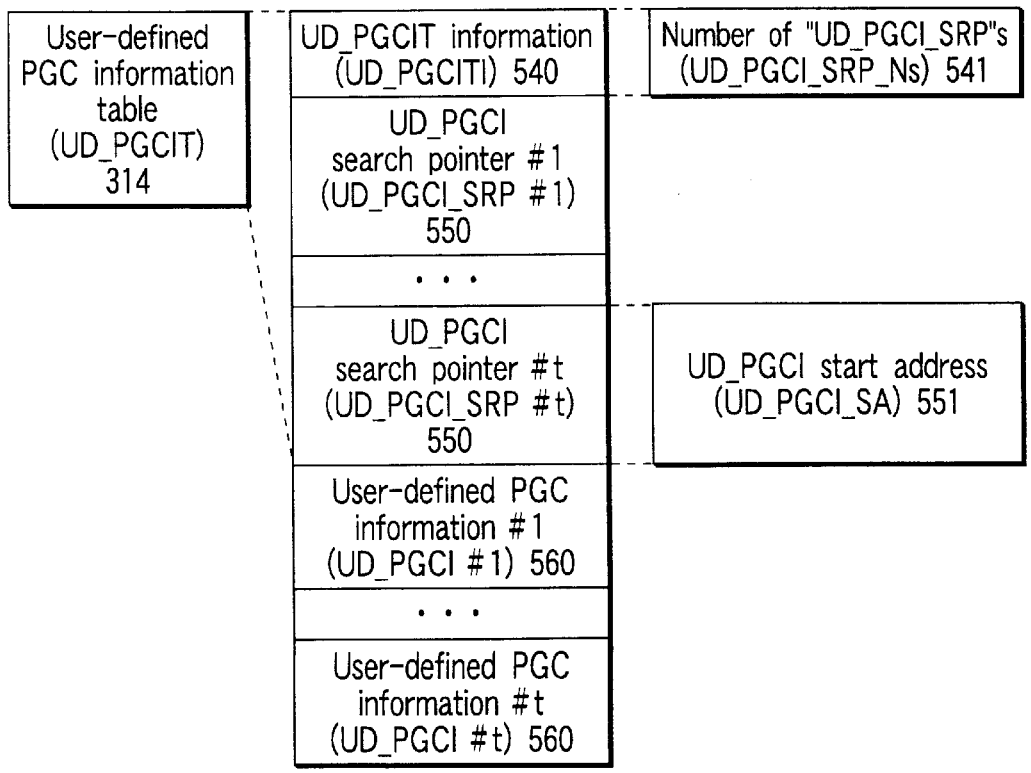
FIG. 7 is a view for explaining an example of the internal data structure of a user-defined PGC information table (UD_PGCIT) as contents reproduction control information.

FIG. 7 is a view for explaining an example of the internal data structure of the user-defined PGC information table (UD_PGCIT) as contents reproduction control information in the DVD-AR standards.

As shown in FIG. 7, user-defined PGC information table 341 contains user-defined PGC information table information (UD_PGCITI) 540, one or more user-defined PGC information search pointers (UD_PGCI_SRP#1 to UD_PGCI_SRP#t) 550, and one or more pieces of user-defined PGC information (UD_PGCI#1 to UD_PGCI#t) 560. Note that UD_PGCITI 540 has number of pieces of user-defined PGC information (UD_PGCI_SRP_Ns) 541 contained in the table. Each UD_PGCI_SRP 550 has start position (UD_PGCI_SA) 551 of corresponding user-defined PGC information.

Figure 8:
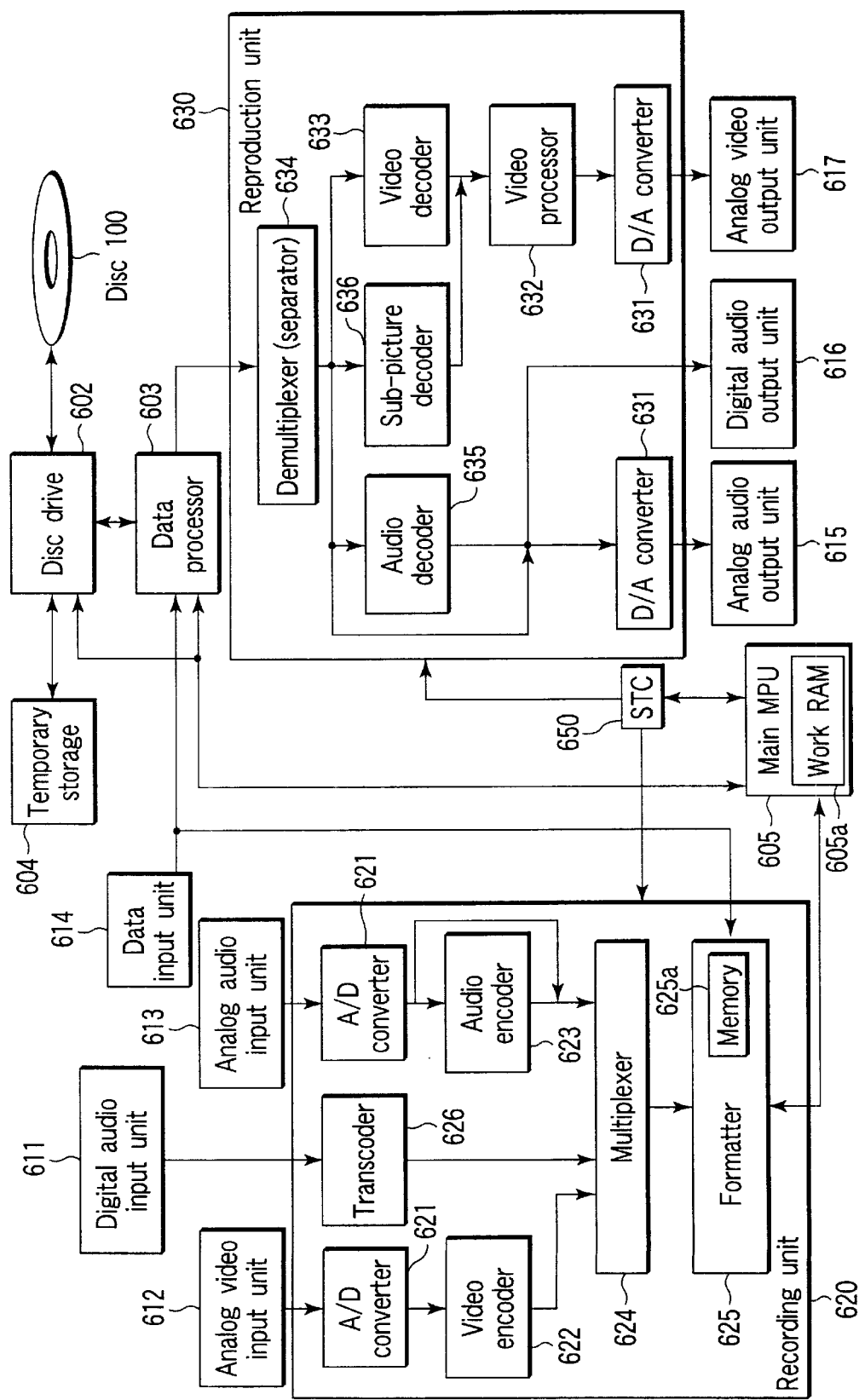
FIG. 8 is a block diagram for explaining an example of the arrangement of a recording/reproduction apparatus for recording a plurality of pieces of contents information managed in units of files and their contents management information on, e.g., the information storage medium shownlin FIG. 1, and reproducing the recorded contents information from this medium.

FIG. 8 is a block diagram for explaining an example of the arrangement of a recording/reproduction apparatus for recording a plurality of pieces of contents information managed in units of files and their contents management information on, e.g., information storage medium (recordable/reproducible disc) 100 shown in FIG. 1, and reproducing the recorded contents information from this disc 100.

Referring to FIG. 8, recording unit 620 and reproduction unit 630 are controlled by main MPU 605 in which a predetermined control program (firmware) runs using work RAM 605a. Under the control of main MPU 605, a process for recording contents information input from various input units 611 to 614 on disc 100 via data processor 603 and disc drive 602, and a process for reproducing and outputting contents information read out from disc 100 via disc drive 602 and data processor 603 to various output units 615 to 617 are executed. In this recording or reproduction output process, information can be buffered in temporary storage 604 during read/write intervals of disc drive 602.

In recording unit 620, video information input from analog video input unit 612 is encoded by video encoder 622 via A/D converter 621, and the encoded video information is supplied to multiplexer 624. Likewise, audio information input from analog audio input unit 613 is encoded by audio encoder 623 via A/D converter 621, and the encoded audio information is supplied to multiplexer 624. Note that the encoding process (e.g., compression process) in audio encoder 623 may be skipped.

Audio information compressed by a specific audio compression scheme (AAC, ATRAC3, MP3, WMA, or the like) input from digital audio input unit 611 is expanded (decoded) to be transcoded into linear PCM data by transcoder 626, and the transcoded information is supplied to multiplexer 624.

Alternatively, audio information compressed by a specific audio compression scheme is expanded (decoded) to be transcoded into linear PCM data, and is then lossless-compressed to be transcoded into packed PCM data by transcoder 626, and the transcoded information is supplied to multiplexer 624.

Multiplexer 624 multiplexes the received information (music information containing linear PCM data or lossless-compressed PCM data) into an MPEG program stream using memory 625a as a work area.

Formatter 625 appends management data from main MPU 605 to the multiplexed stream, thus forming contents information with the data structure (see FIG. 10 or 11) according to the present invention. The formed contents information is recorded on disc 100.

In reproduction unit 630, management data of contents information read out from disc 100 is sent to main MPU 605, and multiplexed stream data is sent to demultiplexer 634.

Demultiplexer 634 demultiplexes the multiplexed MPEG program stream into audio information, sub-picture information, video information, and additional information. The demultiplexed audio information is decoded (e.g., decompression expansion process of AAC or MP3) by audio decoder 635, and is output to digital audio output unit 616 or to analog audio output unit 615 via D/A converter 631. Note that the decoding process in audio decoder 635 may be skipped.

Likewise, the sub-picture information is decoded by sub-picture decoder 636, and the video information is decoded by video decoder 633. The decoded sub-picture and video data are composited by video processor 632, the composite data is converted into an analog video signal by D/A converter 631, and the analog video signal is output to analog video output unit 617. On the other hand, the additional information (information input from data input unit 614, information appended to digital audio data input from digital audio input unit 611, or the like) is sent to main MPU 605.

Main MPU 605 can execute various kinds of control (FIGS. 16 to 21 to be described later) on the basis of the received information by appropriately using clocks from system time clock (STC) 650 as a basis of operation timings.

Figure 9:
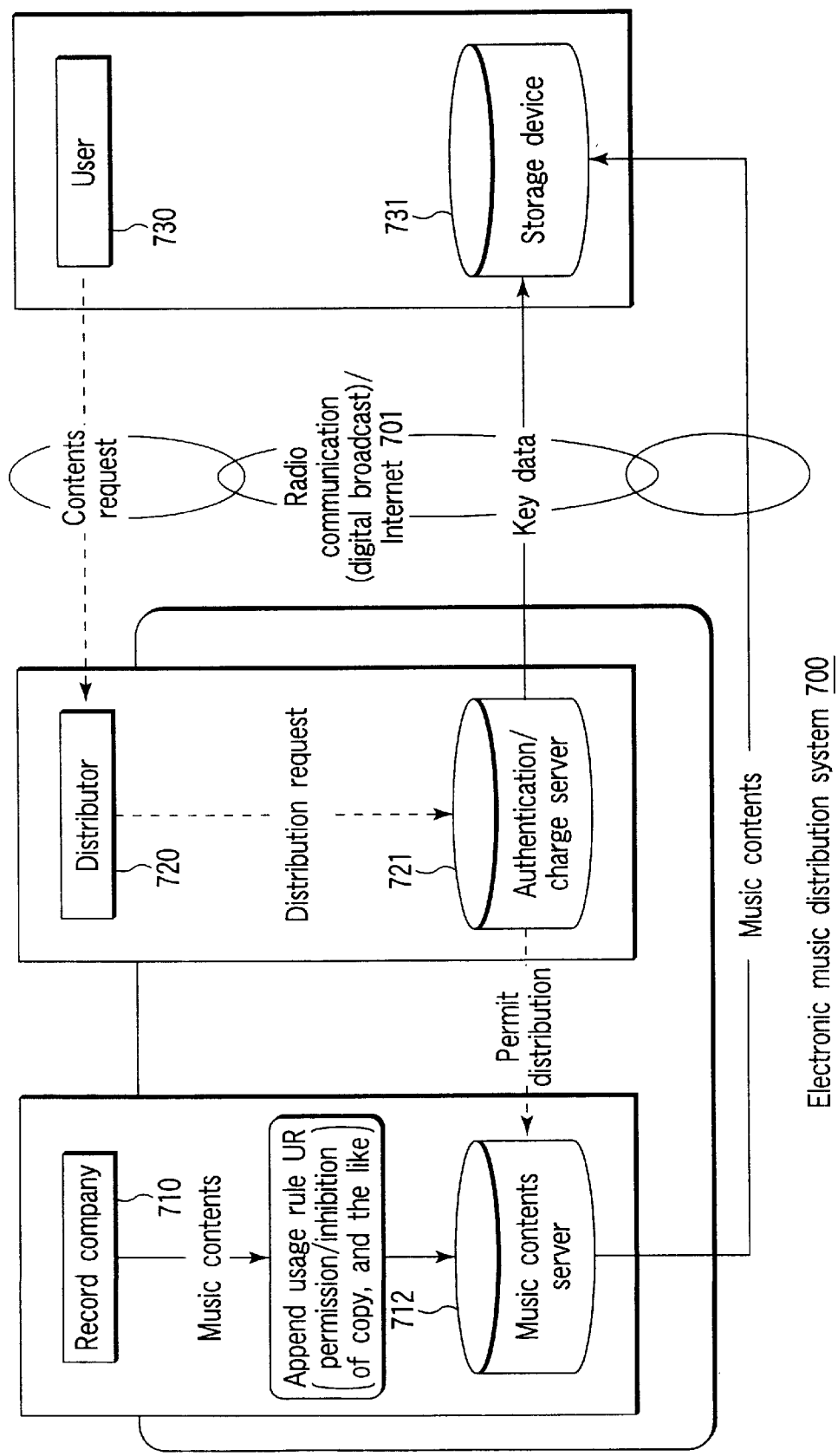
FIG. 9 is a diagram for explaining an example of the system arrangement of an EMD system.

FIG. 9 is a diagram for explaining an example of the system arrangement of an electronic music distribution system. This is an example of EMD (Electronic Music Distribution) system 700 used by a record company 710 and the like.

Record company 710 appends usage rules UR containing copyright information of a copyright holder and the like, and copy control information such as copy permission/inhibition and the like to music data it possesses, and stores and saves them in music contents server 712. User 730 sends a distribution request of music contents to an electronic music store site conducted by contents distributor 720 or the like via radio communication (e.g., two-way communications of digital broadcast or the like).Internet (telephone line or the like) 701. Authentication-charge server 721 receives the distribution request from distributor 720, charges user 730 for distribution, and grants music contents server 712 permission to distribute.

User 730 receives key data for descrambling (deciphering) music contents from authentication charge server 721. Also, user 730 receives scrambled (enciphered) music contents from music contents server 712 via radio communication-Internet 701, and saves the received contents in his or her storage device 731. A recording/reproduction system of this device 731 can have the arrangement shown in FIG. 8. The data structure/file structure of storage medium 100 used in this device 731 can be constructed, as shown in FIGS. 1 to 7. Furthermore, a sequence upon storing the music contents distributed from music contents server 712 in storage medium 100, and a file (,coupled file) structure used at that time are as shown in FIGS. 10 and 11.

Figure 10:
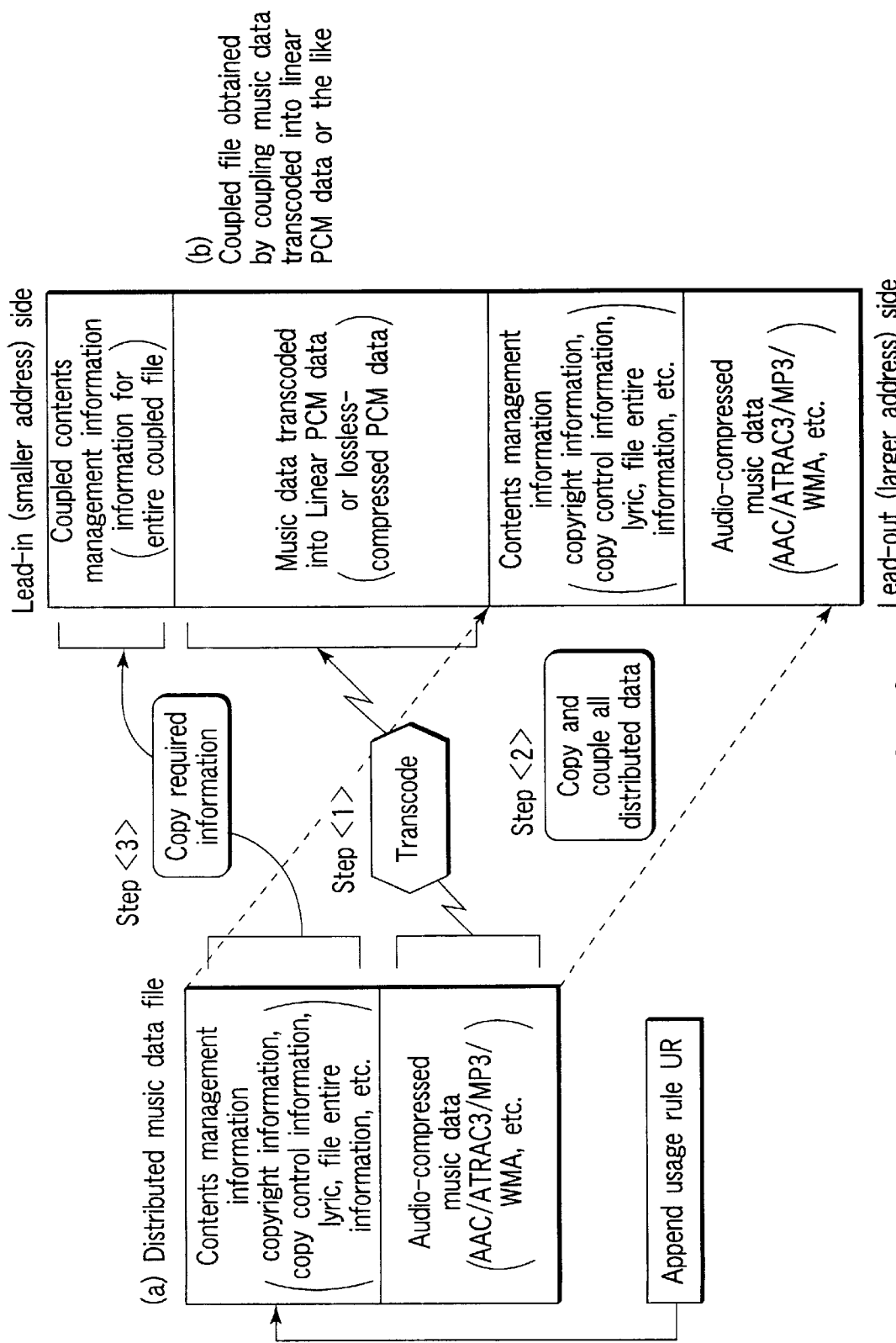
FIG. 10 is a chart for explaining an example of the way distributed music contents (audio-compressed or the like) using the apparatus shown in FIG. 8.

FIG. 10 is a view for explaining an example of the way distributed music contents (audio-compressed music data and the like) are stored in an information storage medium (optical disc or the like).

For example, music contents distributed from music distribution system 700 shown in FIG. 9 can have a file structure exemplified in FIG. 10(a). This file is comprised of music data audio-compressed by AAC, MP3, or the like (music data for one tune or music data for one album), and contents management information for managing the entire music contents. The contents management information can contain information indicating the type of audio compression scheme used, information of usage rules UR (allowable reproduction count, reproduction valid date, permission/inhibition of copy, allowable copy count, permission/inhibition of move, allowable move count, and the like) that pertains to the copyright, copy control, and the like, and other kinds of information. These pieces of information are often segmented for respective files.

Note that music contents distributed from music distribution system 700 in FIG. 9 is delivered to the user in the file format that contains contents management information such as copyright management information, copy control information, and the like associated with music data, in addition to audio-compressed music data (music data and contents management information may be delivered in different files). Also, key data for deciphering (descrambling) enciphered (scrambled) music contents may be delivered to the user who normally acquired such music contents, in addition to the music contents. This is to inhibit illicitly acquired contents from being reproduced without key data.

The distributed music data file shown in FIG. 10(a) is recorded (downloaded) on disc 100 shown in FIG. 1 by the apparatus shown in FIG. 8 in the following sequence (steps <1> to <3>).

More specifically, when the music data file in FIG. 10(a) is input to the apparatus in FIG. 8 via digital audio input unit 611 and data input unit 614, transcoder 626 in recording unit 620 transcodes audio-compressed music data into linear PCM (or lossless-compressed packed PCM) music data (MPEG program stream) under the control of main MPU 605.

The linear PCM or lossless-compressed PCM music data transcoded in this way has reproduction compatibility to the existing DVD audio standards. The MPEG program stream of the linear PCM or lossless-compressed PCM music data with reproduction compatibility is recorded as a music distribution compatible coupled file in a non-recorded area (e.g., a free area of audiovideo related, information recording area 121 or AR distributed data recording area 134) of data area 112 on disc 100 shown in FIG. 1 (step <1>).

Then, all the compressed music data as a source of the transcoded linear PCM or lossless-compressed PCM music data are recorded on a non-recording area (e.g., a free area of general computer information recording area 120) of data area 112 on disc 100 together with its contents management information (step <2>). A group of contents management information+compressed music data is recorded to be coupled after (on the lead-out area side or larger address side of the disc of) the recorded position of the transcoded linear PCM or lossless-compressed PCM music data. That is, all distributed music contents files are recorded to be coupled to the end side of the aforementioned music distribution compatible coupled file via data input unit 614 and the like.

Furthermore, required information (copyright information, copy control information, lyric information, entire file information, and/or appended usage rules UR, and the like) is copied as needed to a coupled contents management information area assured on the head side (on the lead-in area side or smaller address side of the disc) of the recorded position of the transcoded linear PCM or lossless-compressed PCM music data (step <3>).

All pieces of information recorded/copied in this way (coupled contents management information+linear PCM or lossless-compressed PCM music data+original contents management information+original compressed music data) form a single coupled file, and are recorded in a non-recording area of disc 100. One or more coupled files can be recorded (for example, if 1 file=1 tune, a plurality of coupled files for a plurality of tunes can be recorded). A group of one or more coupled files recorded in this way can be managed by the directory structure shown in FIG. 2 or 3.

When music data in the coupled file in FIG. 10(b) is to be reproduced, if a reproduction apparatus is compatible to the compressed music data (e.g., if the reproduction apparatus comprises an MP3 decoder when MP3-encoded music data is recorded), the compressed music data (original data) in the coupled file is reproduced (transcoded PCM data may be reproduced).

On the other hand, even when the reproduction apparatus is not compatible to the compressed music data (e.g., if a reproduction apparatus does not comprise an AAC decoder when AAC-encoded music data is recorded), a linear PCM decoder (or packed PCM decoder) as standard equipment of that apparatus (e.g., DVD audio player) can reproduce the PCM music data (transcoded data). In this way, even the reproduction apparatus which is not compatible to the distributed compressed music data (but is compatible to linear PCM or lossless-compressed PCM as a standard function) can reproduce the distributed music contents using the transcoded PCM data.

FIG. 11 is a view for explaining another example of the way distributed music contents (audio-compressed music data and the like) are stored in an information storage medium (optical disc or the like).

FIG. 11 is substantially the same as FIG. 10 except for the following point. That is, in the coupled file in FIG. 11, contents management information+compressed audio data are allocated on the lead-in area side (smaller address side) of disc 100, and coupled contents management information+linear PCM/lossless-compressed PCM (packed PCM) music data are allocated on the lead-out area side (larger address side). Due to this different allocation, in FIG. 11, all distributed data are copied first, and are then transcoded. The present invention can be practiced by adopting either the coupled file structure of FIG. 10 or 11.

Figure 12:
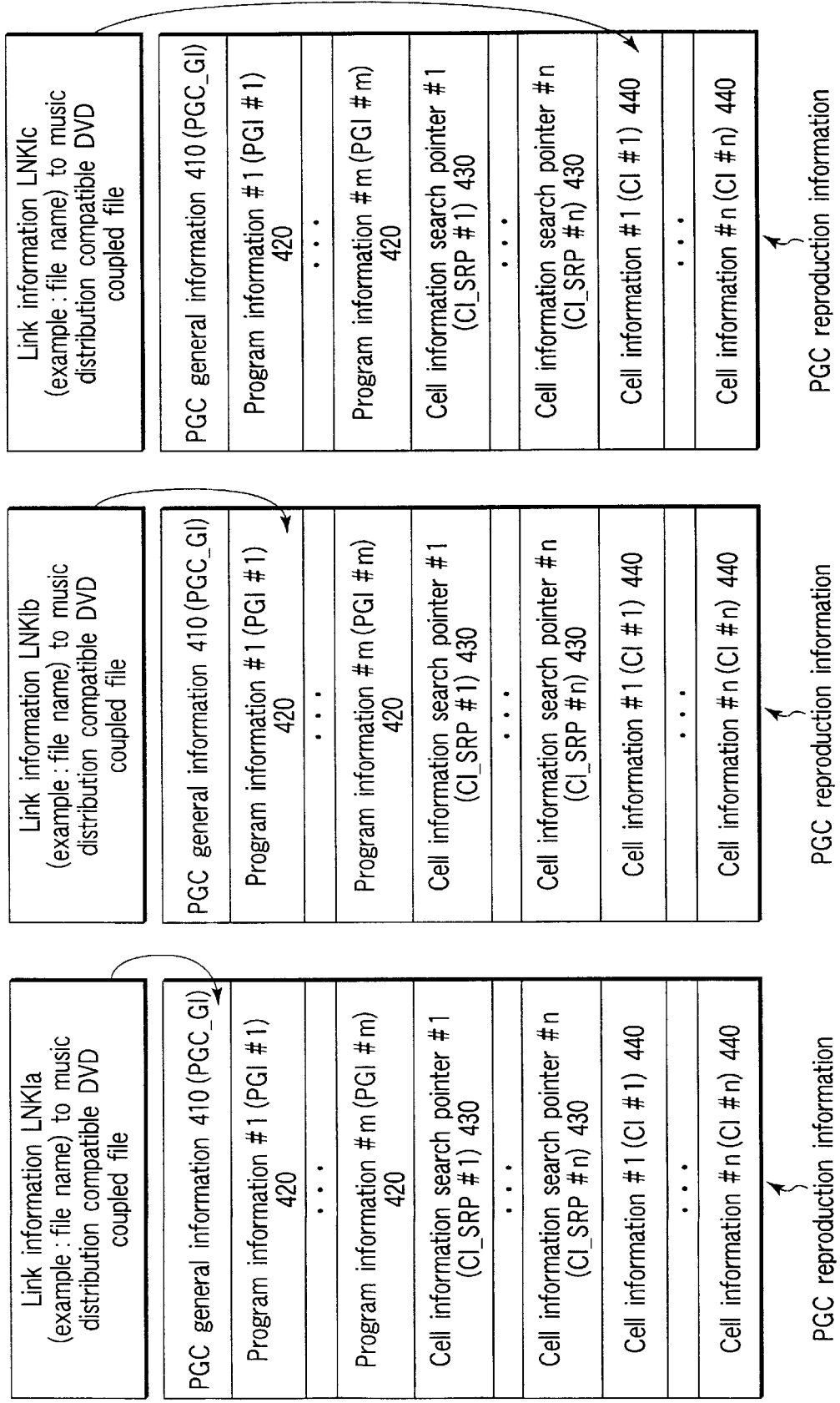
FIG. 12 is a view showing an example of the storage location of link information (e.g., a file name using an album title name, individual tune names, singer name, or the like) to a coupled file shown in FIG. 10(b) or 11(b) in program chain information (PGCI) shown in FIG. 5.

FIG. 12 is a view showing an example of the storage location of link information (e.g., a file name using an album title name, individual tune names, singer name, or the like) to the coupled file shown in FIG. 10(b) or 11(b) in program chain information (PGCI) shown in FIG. 5. As shown in FIGS. 12(a) to 12(c), "link information" to the music distribution compatible DVD coupled file is contained in PGC reproduction information as the reproduction basic structure of the DVD audio recording standards. In this manner, when a DVD-AR compatible player reproduces music data transcoded into linear PCM (or lossless-compressed PCM) data, reproduction compatibility to music-distributed music contents can be assured.

FIG. 13 is a view for explaining an example of the data structure when link information to the coupled file is stored in PGC general information in FIG. 12(a). FIG. 13 shows an example when link information (file name using, e.g., a tune name or the like) 413 is stored in PGC general information 410. Since PGC general information 410 contains EMD file link information (LNKIa) 413, link information (LNKIa) 413 is registered in a play list of play list search pointer 520 in FIG. 6. As a result, music contents linked by link information (LNKIa) 413 can be reproduced when the user selects a play list.

Figure 14:
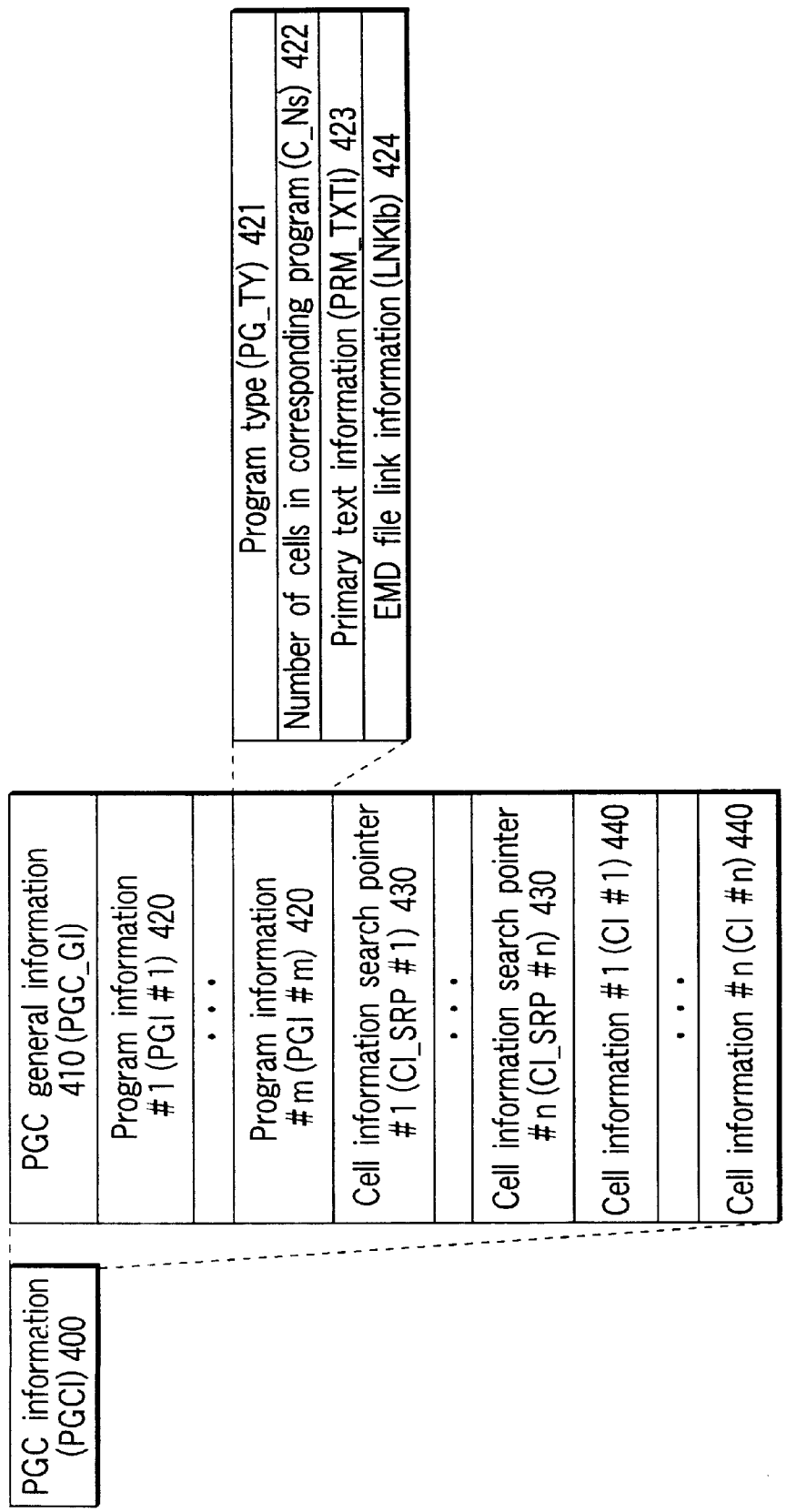
FIG. 14 is a view for explaining an example of the data structure upon storing the link information to the coupled file in p rogram information in FIG. 12(b)

FIG. 14 is a view for explaining an example of the data structure when link information to the coupled file is stored in program information in FIG. 12(b). FIG. 14 shows an example when link information 424 is stored in program information 420. Program information 420 contains EMD file link information (LNKIb) 424. Using this link information (LNKIb) 424, music contents linked to respective pieces of program information stored in a PGC can be seamlessly reproduced.

Figure 15:
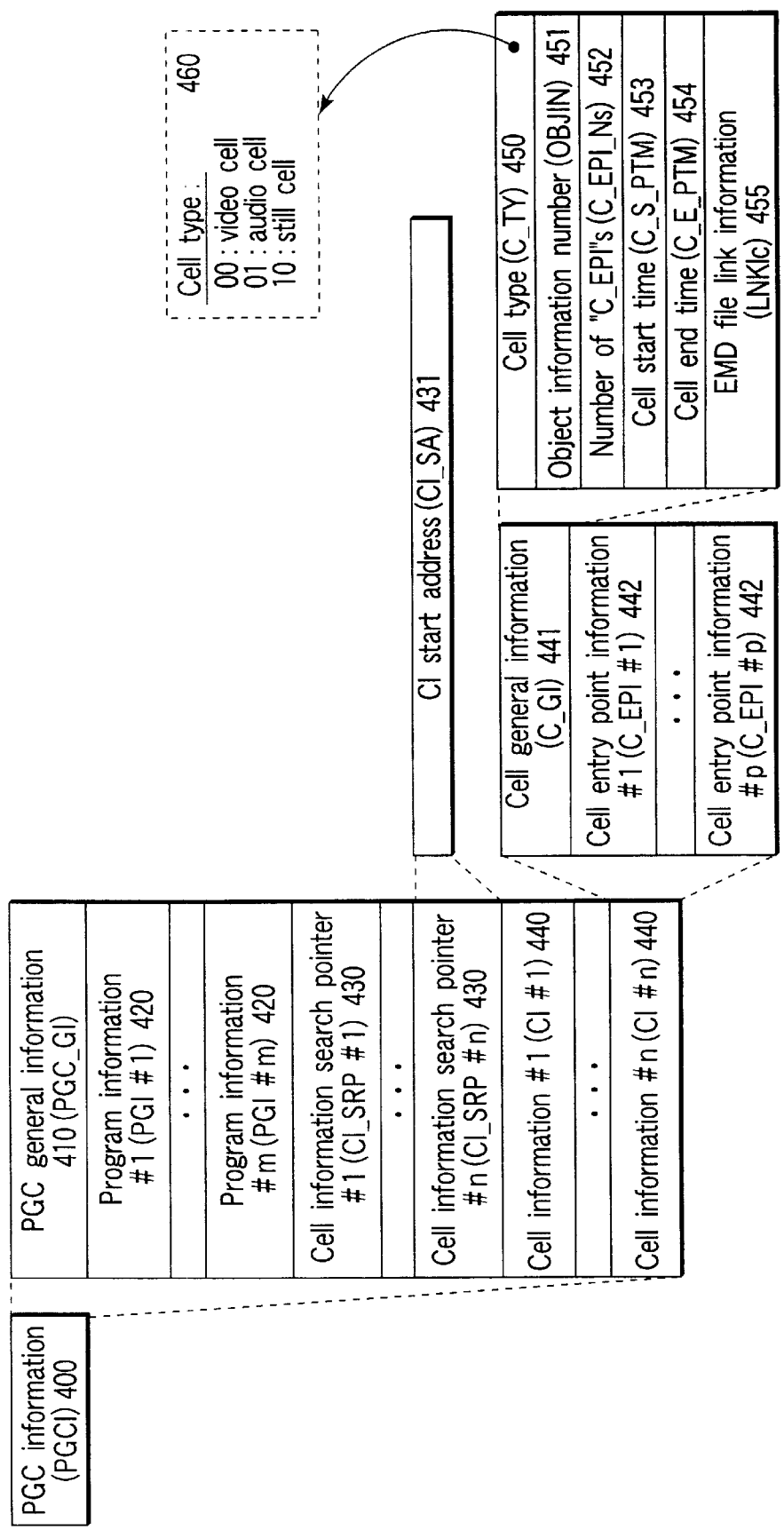
FIG. 15 is a view for explaining an example of the data structure upon storing the link information to the coupled file in cell information in FIG. 12(c)

FIG. 15 is a view for explaining an example of the data structure when link information to the coupled file is stored in cell information in FIG. 12(c). FIG. 15 shows an example when link information 455 is stored in cell information 440. Cell information 430 contains EMD file link information (LNKIC) 455. Using this link information (LNKIC) 455, seamless reproduction that joins all or some arbitrary music contents linked to respective pieces of cell information stored in a program can be achieved.

Note that the link information stored in PGC information 400 in FIGS. 13 to 15 is indicated by the file name of a music distribution compatible coupled file in this embodiment.

Figure 16:
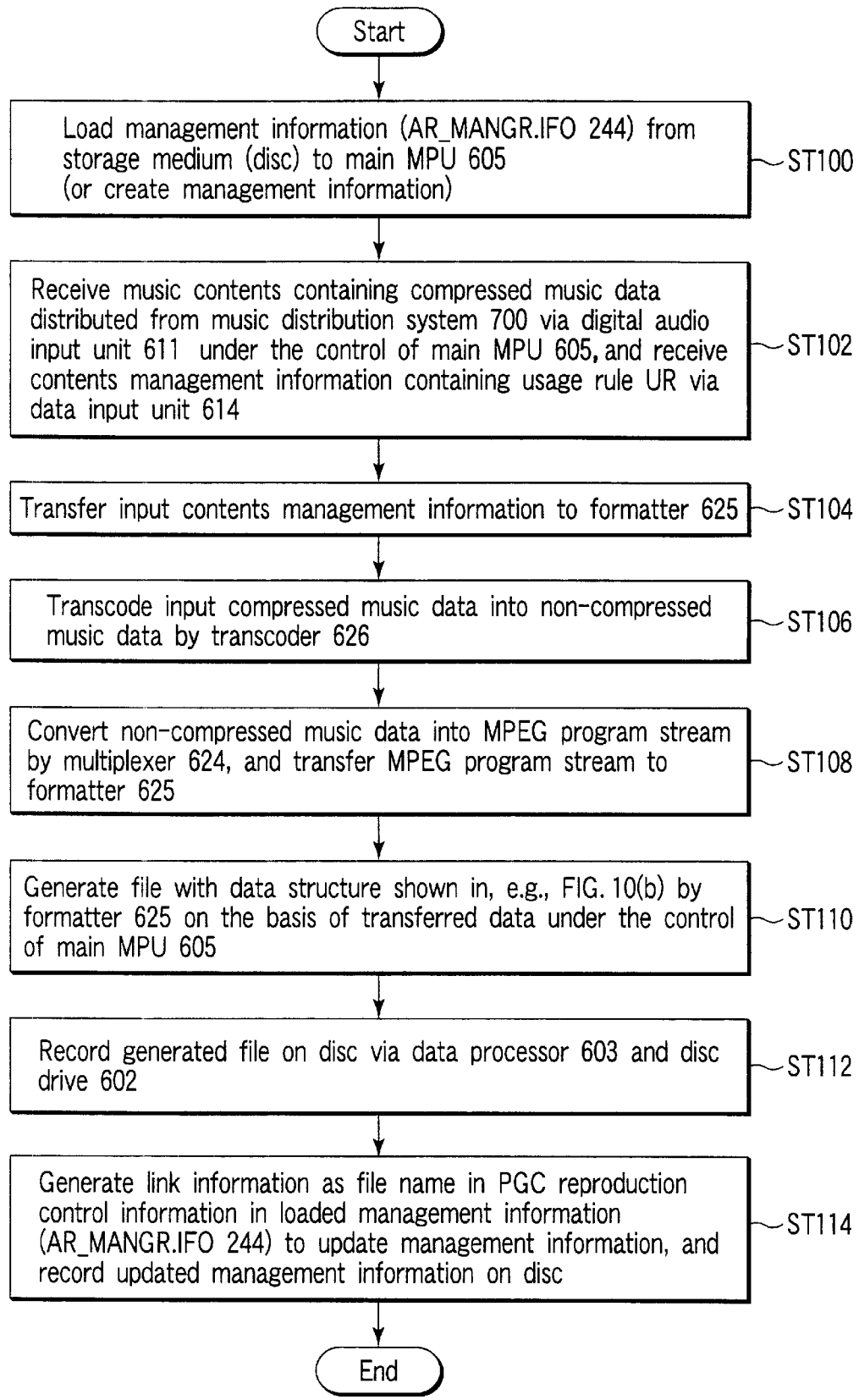
FIG. 16 is a flow chart for explaining an example of the processing sequence when distributed music contents (audio-compressed music data and the like) are recorded on an information storage medium (optical disc which is recorded in an audio-video related information recording area on the information storage medium shown in FIG. 1.

FIG. 16 is a flow chart for explaining an example of the processing sequence when distributed music contents (audio-compressed music data and the like) are recorded on an information storage medium (optical disc or the like) using the apparatus shown in FIG. 8. FIG. 16 shows a recording method of transcoding distributed audio-compressed music contents into data such as linear PCM or the like suitable to assure reproduction compatibility, and multi-recording both the original music contents and transcoded music contents.

When a connection to music distribution system 700 is established and music contents are distributed from the system, a management information file (AR_MANGR.IFO 244) is loaded from disc 100 to main MPU 605, or a new management information file (AR_MANGR.IFO) is created in the case of new recording (when disc 100 is a blank disc or the like) (step ST100).

Music contents which are distributed from music distribution system 700 and contain compressed music data are input from digital audio input unit 611, and contents management information containing usage rules UR of the music contents are input from data input unit 614 under the control of main MPU 605 (step ST102). The input contents management information is sent to formatter 625 (step ST104).

Subsequently, the input compressed music data is transcoded into non-compressed music data (or lossless-compressed music data) by transcoder 626 (step ST106). The non-compressed music data (or lossless-compressed music data) is converted into an MPEG program stream by multiplexer 624, and is transferred to formatter 625 (step ST108).

Formatter 625 creates a music distribution compatible coupled file with the data structure shown in FIG. 10(*b*) or 11(*b*) using the transferred data under the control of main MPU 605 (step ST110). The created file is recorded on disc 100 via data processor 603 and disc drive 602 (step ST112).

Finally, link information is created as a file name in PGC reproduction control information in the management information file (AR_MANGR.IFO 244) loaded (or created) in step ST100. The management information file is updated, and the updated management information file is recorded on disc 100 (step ST114).

Figure 17:
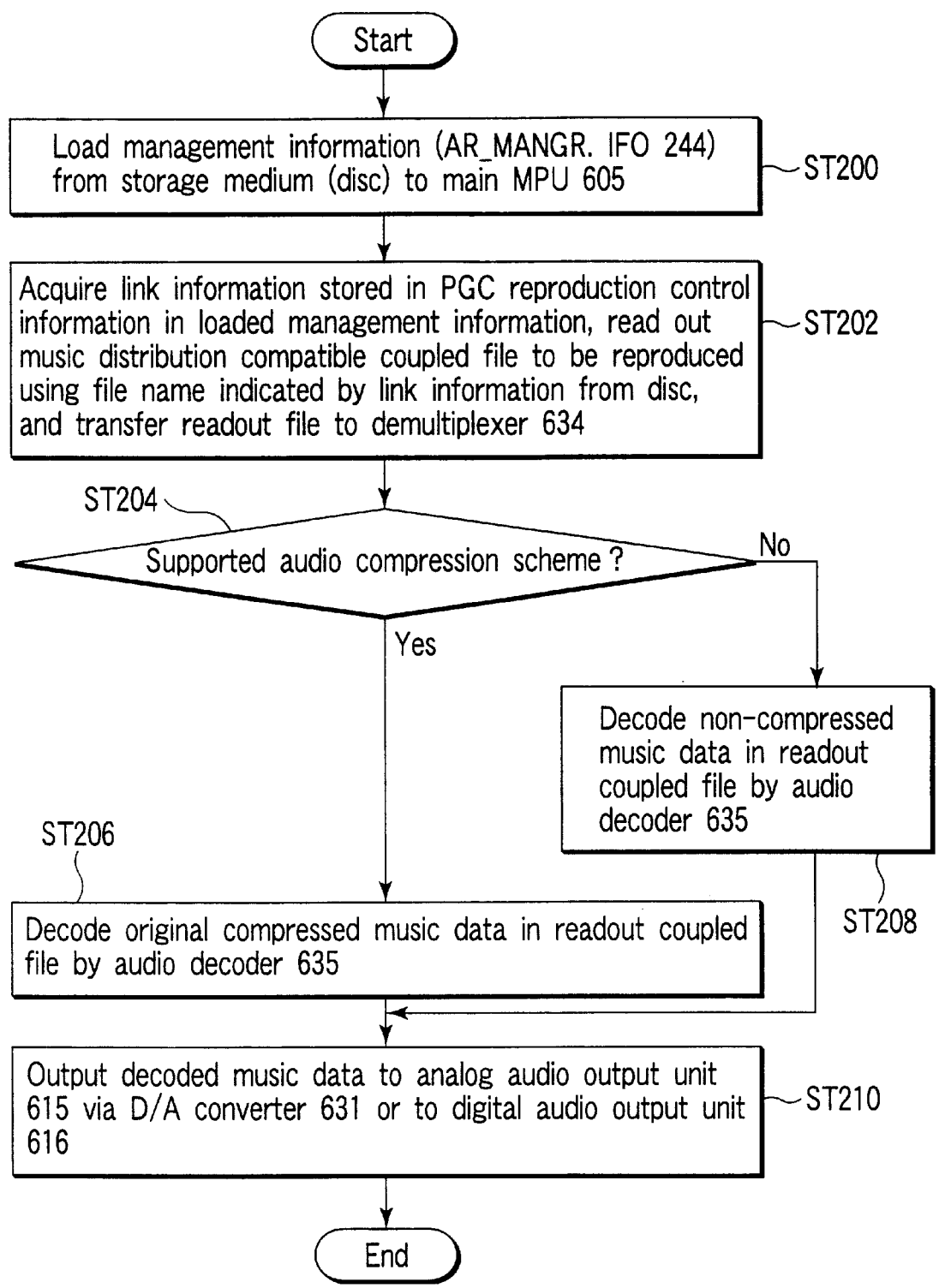
FIG. 17 is a flow chart for explaining an example of the processing sequence when music contents (compressed music data and/or PCM music data having the same contents as the compressed music data) recorded on an information storage medium (optical disc or the like) are reproduced using the apparatus shown in FIG. 8.

FIG. 17 is a flow chart for explaining an example of the processing sequence when music contents (compressed music data and/or PCM music data having the same contents as the compressed music data) recorded on an information storage medium (optical disc or the like) are reproduced using the apparatus shown in FIG. 8. FIG. 17 shows a reproduction method of reproducing music data from a music distribution compatible coupled file.

A management information file (AR_MANGR.IFO 244) is loaded from disc 100 to main MPU 605 (step ST200). Then, link information stored in PGC reproduction control information in the loaded management information file is acquired. Based on that file name, a music distribution compatible coupled file to be reproduced is read out from disc 100, and is transferred to demultiplexer 634 (step ST202).

It is checked if the transferred file contains compressed music data of an audio compression scheme supported by the reproduction apparatus (step ST204).

If the check result indicates the supported audio compression scheme (YES in step ST204), original compressed music data in the readout coupled file is decoded by audio decoder 635 (step ST206). The decoded music data is output to analog audio output unit 615 via D/A converter 631 or to digital audio output unit 616 (step ST210).

If the check result indicates an unsupported audio compression scheme (NO in step ST204), non-compressed music data (or lossless-compressed music data) in the readout coupled file is decoded by audio decoder 635 (step ST208). The decoded music data is output to analog audio output unit 615 via D/A converter 631 or to digital audio output unit 616 (step ST210).

Figure 18:
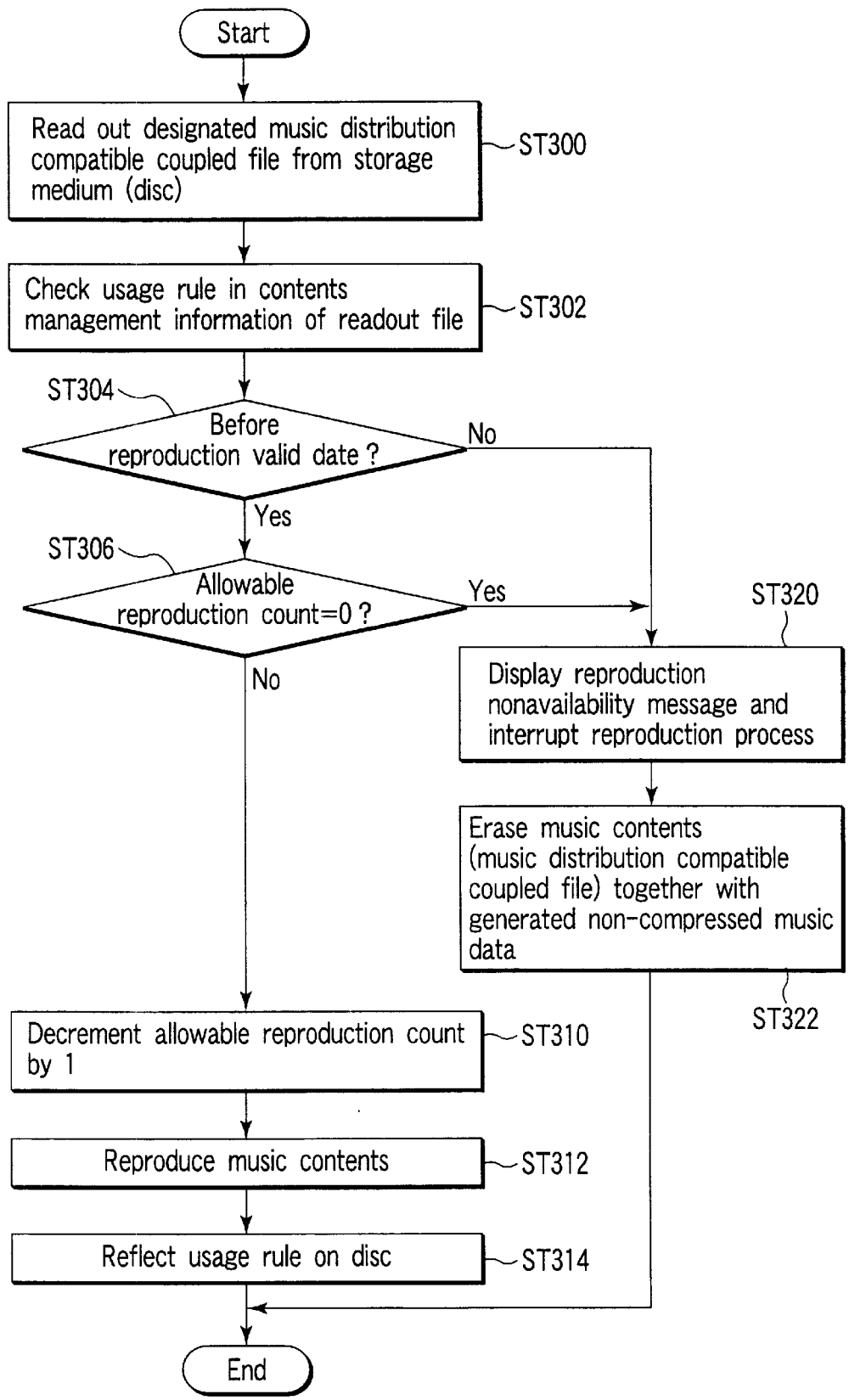
FIG. 18 is a flow chart for explaining an example of a control process according to usage rules when the usage rules (reproduction valid date, allowable reproduction count, and the like) are appended to music contents (compressed music data and/or PCM music data having the same contents as the compressed music data) recorded on an information storage medium (optical disc or the like)

FIG. 18 is a flow chart for explaining an example of a control process according to usage rules UR when usage rules UR (reproduction valid date, allowable reproduction count, and the like) is appended to music contents (compressed music data and/or PCM music data having the same contents as the compressed music data) recorded on an information storage medium (optical disc or the like). FIG. 18 shows a reproduction control method of music contents according to usage rules UR of the music distribution system.

A music distribution compatible coupled file designated by, e.g., the user is read out from disc 100 (step ST300). Usage rules UR in contents management information of the readout file are checked (step ST302). In this checking step, it is checked based on a reproduction valid date information as one of the usage rules UR if the reproduction valid date has not expired.

If the reproduction valid date has not yet expired (YES in step ST304), it is checked if an allowable reproduction count as another one of the usage rules UR is zero (step ST306). If the allowable reproduction count is not zero, i.e., the allowable reproduction count is valid (NO in step ST306), the allowable reproduction count is decremented by 1 (step ST310) to reproduce music contents (ST312). Upon executing this reproduction, new usage rules UR (the allowable reproduction count has been decremented by one) are reflected on disc 100 (step ST314), thus ending the processing in FIG. 18.

If the reproduction valid date has expired, i.e., the reproduction valid date is invalid (NO in step ST304) or if the allowable reproduction count is zero, i.e., the allowable reproduction count is invalid (YES in step ST306), a reproduction nonavailability message is displayed as needed, and the reproduction process is interrupted (step T320). In this case, music contents (music distribution compatible coupled files) are deleted together with the generated non-compressed music data (and/or lossless-compressed music data) (step ST322), thus ending the processing in FIG. 18.

Figure 19:
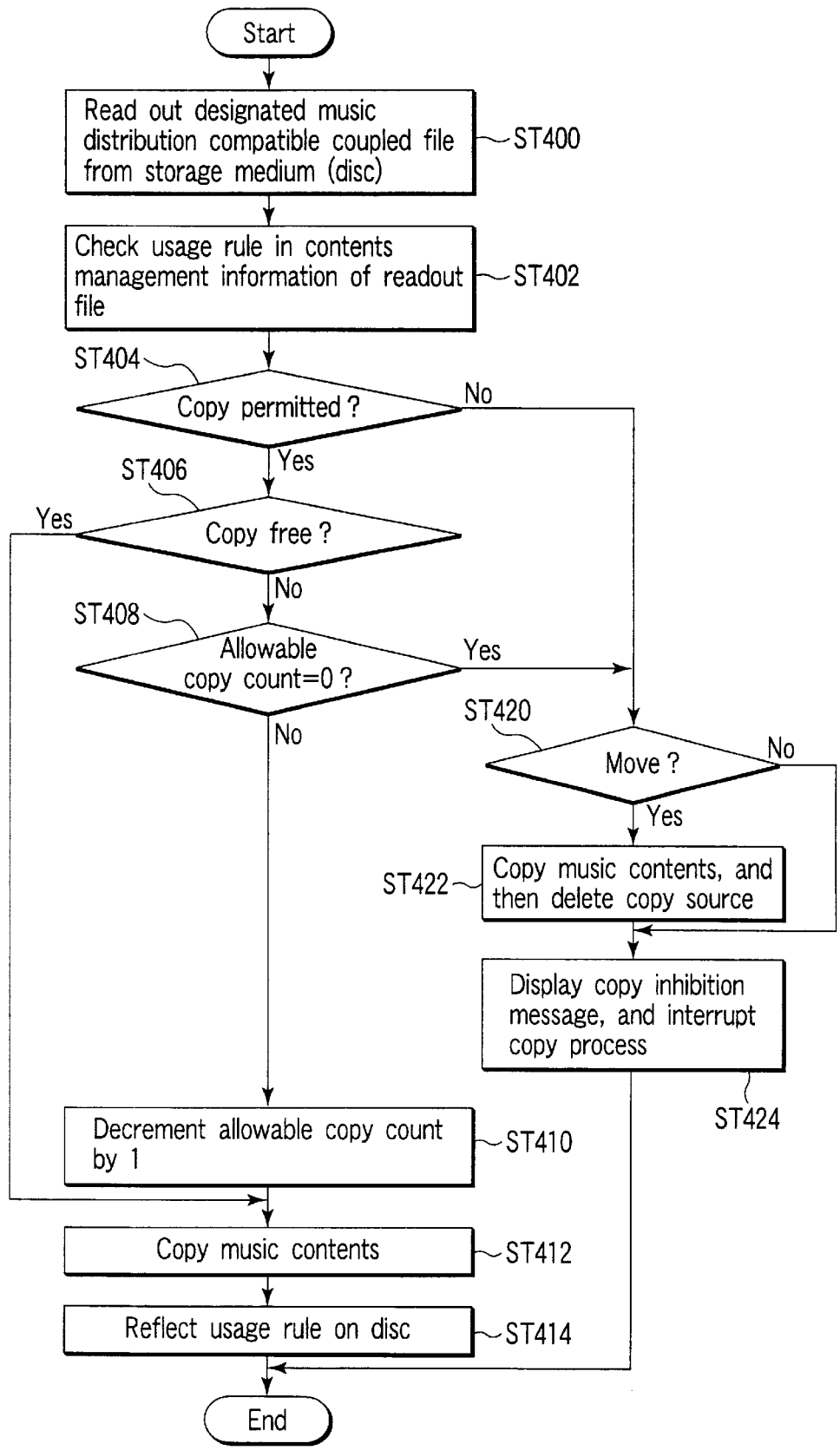
FIG. 19 is a flow chart for explaining another example of a control process according to other usage rules when the usage rules (copy permission/inhibition, an allowable copy count, and the like) are appended to music contents (compressed music data and/or PCM music data having the same contents as the compressed music data) recorded on an information storage medium (optical disc or the like)

FIG. 19 is a flow chart for explaining another example of a control process according to other usage rules when the usage rules (copy permission/inhibition, an allowable copy count, and the like) are appended to music contents (compressed music data and/or PCM music data having the same contents as the compressed music data) recorded on an information storage medium (optical disc or the like). FIG. 19 shows a copy/move control method of music contents according to usage rules UR of the music distribution system.

A music distribution compatible coupled file designated by, e.g., the user is read out from disc 100 (step ST400). Usage rules UR in contents management information of the readout file are checked (step ST402). In this checking step, it is checked based on copy permission/inhibition information as one of the usage rules UR if copy is permitted.

If copy is permitted (YES in step ST404), it is checked if the contents are copy free (step ST406). If the contents are not copy free (NO in step ST406), it is checked if an allowable copy count as one of the usage rules UR is zero (step ST408).

If the allowable copy count is not zero, i.e., if the allowable copy count is valid (NO in step ST408), the allowable copy count is decremented by 1 (step ST410), and music contents are copied to another information storage medium (step ST412). On the other hand, if the contents are copy free (YES in step ST406), the processes in steps ST408 to ST410 are skipped, and the flow jumps to the copy process in step ST412.

Upon executing copy, new usage rules UR (the allowable copy count has been decremented by 1 and so forth) are reflected on disc 100 (step ST414), thus ending the processing in FIG. 19.

On the other hand, if copy is inhibited (NO in step ST404) or if the allowable copy count is zero, i.e., the allowable copy count is invalid (YES in step ST408), it is checked if a move request of music contents is detected (step ST420).

If the move request is detected (YES in step ST420), music contents are copied to another information storage medium, and the music contents (copy source) in disc 100 are then deleted or erased (step ST422). A copy nonavailability message is displayed as needed, and the copy process is interrupted (step ST424), thus ending the processing in FIG. 19.

Note that a "move message" indicating that the music contents have moved may be displayed in step ST422.

If a move request is not detected (NO in step ST420), the process in step ST422 is skipped, a copy inhibition message is displayed as needed, and the copy process is interrupted (step ST424), thus ending the processing in FIG. 19.

FIG. 20 is a diagram for explaining a system in which music contents are downloaded from EMD system 700 shown in FIG. 9 to optical disc (information storage medium) 100 by information recording/reproduction apparatus 600 shown in FIG. 8, and which can move (check out) the downloaded music contents to memory card (another information storage medium) 800, or can return (check in) the music contents from memory card 800 to original optical disc 100 shown in FIG. 1. FIG. 20 shows an example of the system that uses information recording/reproduction apparatus 600, which can download music contents from EMD system 700, as a music server.

As shown in FIG. 20, downloaded music contents data can be moved between portable memory card 800 (which could be an internal memory of a mobile device such as a portable phone or the like) and information recording/reproduction apparatus 600 while complying with SDMI (Secure Digital Music Initiative) as one of the digital music copyright protection schemes. A process for fetching the downloaded music contents from information recording/reproduction apparatus 600 to memory card 800 is called "check out", and a process for returning the contents from memory card 800 to the information recording/reproduction apparatus is called "check in". With these "check out" and "check in" processes, the user can move music contents of his or her choice to memory card 800, and can delete them from memory card 800 if they become unnecessary.

Figure 21:
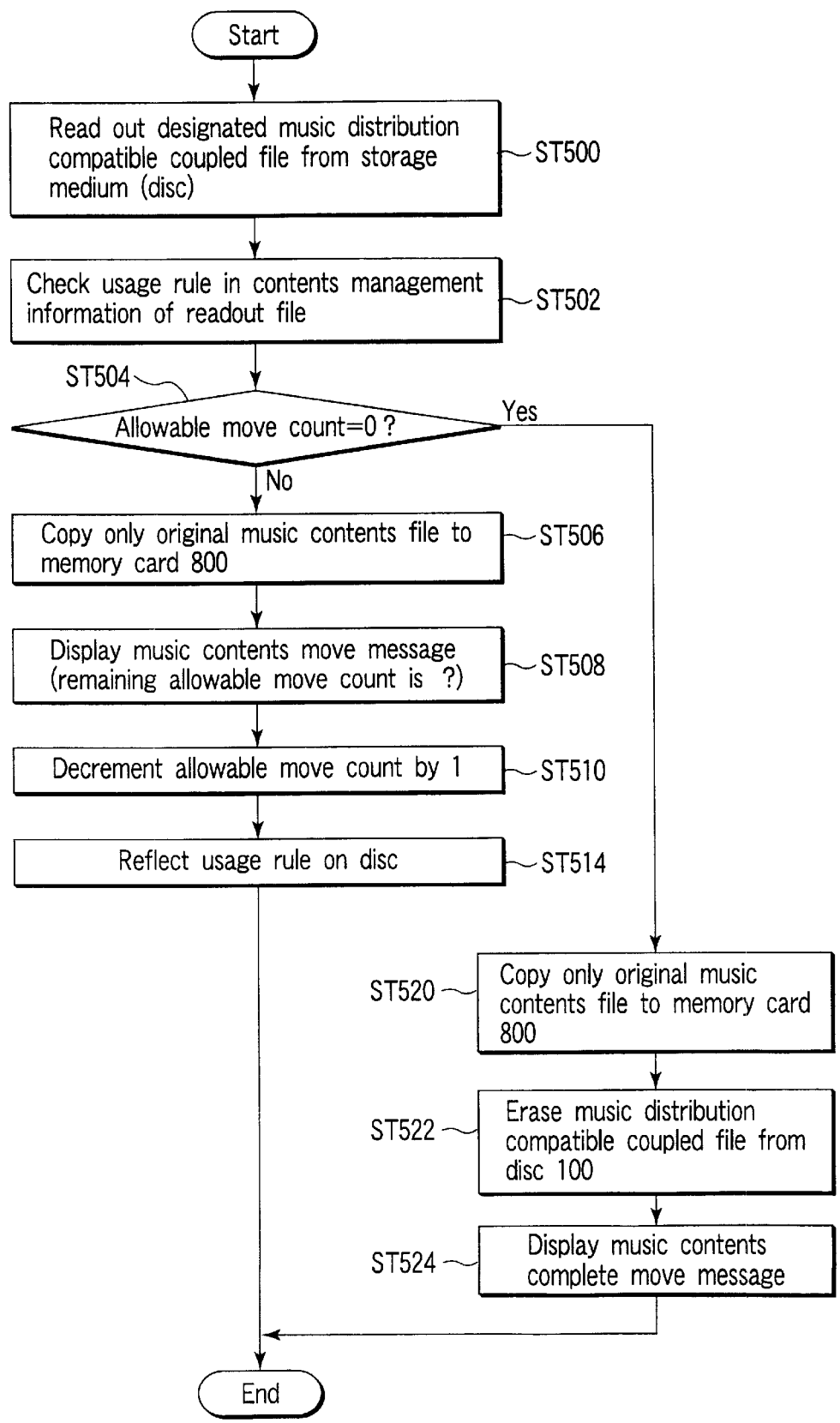
FIG. 21 is a flow chart for explaining an example of a control process according to predetermined usage rules when the usage rules (allowable move count, and the like) are appended to music contents (compressed music data and/or PCM music data having the same contents as the compressed music data or the like) downloaded onto optical disc (information storage medium) 100.

FIG. 21 is a flow chart for explaining an example of a control process according to predetermined usage rules when the usage rules (allowable move count, and the like) are appended to music contents (compressed music data and/or PCM music data having the same contents as the compressed music data or the like) downloaded onto optical disc (information storage medium) 100. FIG. 21 shows a move control method of music contents according to usage rules UR of the music distribution system.

A music distribution compatible coupled file designated by, e.g., the user is read out from disc 100 (step ST500). Usage rules UR in contents management information of the readout file are checked (step ST502). In this checking step, it is checked based on allowable move count information as one of the usage rules UR if the contents are to be moved or copied. If the contents are to be moved,. an allowable move count is checked.

If the allowable move count≠0, i.e., if the contents are movable (NO in step ST504), only the original music contents file in the music distribution compatible coupled file is copied to memory card 800 (execute "check out" once) (step ST506). That is, the original distributed music contents are copied to another information storage medium. (In this copy process, linear PCM or lossless-compressed PCM data generated by transcoding to maintain reproduction compatibility is not copied.) In this way, another copy of the distributed music contents is formed on memory card 800 (with restrictions of usage rules UR) in addition to disc 100 on which the distributed music contents are downloaded. This state is "move".

Upon completion of move (copy) of the music contents, a message indicating this is displayed as needed (step ST508). In this case, the remaining allowable move count may be displayed. The allowable move count is decremented by 1 (step ST510), and new usage rules UR (the allowable move count has been decremented by 1) are reflected on disc 100 (step ST514), thus ending the processing in FIG. 21.

If the allowable move count=0, i.e., the contents are not movable (YES in step ST504), only the original music contents file. (not containing the generated non-compressed music contents) in the music distribution compatible coupled file is copied to memory card 800 (execute "check out" once) (step ST520).

The music distribution compatible coupled file itself (all music contents containing both linear PCM or lossless-compressed PCM music data generated by transcoding and original compressed music data) is deleted from disc 100 (step ST522). A message indicating that the music contents have been completely moved is displayed as needed (step ST524), thus ending the processing in FIG. 21.

When the electronically distributed music contents have been completely moved by the processes in steps ST520 to ST522, the storage medium of the distributed music contents merely changes from disc 100 to memory card 800.

According to an aspect of the embodiment of the present invention, it is possible to record music contents distributed from an EMD system on an information medium such that the recorded contents can be reproduced by a player being made based on the DVD-AR specification.

According to another aspect of the embodiment of the present invention, it is possible to achieve a playback compatibility with a DVD-AR player so that the DVD-AR player can plays back the music contents distributed from the EMD system and stored in the information medium.

According to still another aspect of the embodiment of the present invention, it is possible to achieve the control of copy-permission/inhibition, move, and/or erase of the music contents recorded on the information medium, in accordance with the usage rule UR distributed simultaneously with the music contents.

Note that the present invention is not limited to the aforementioned embodiments, and various modifications may be made without departing from the scope of the invention when it is practiced. The respective embodiments may be combined as needed as long as possible, and combined effects can be obtained in such a case.

Furthermore, the embodiments include inventions of various stages, and various inventions can be extracted by appropriately combining a plurality of constituent requirements disclosed in this application. For example, even when some constituent requirements are deleted from all the constituent requirements disclosed in the embodiments, an arrangement from which those constituent requirements are deleted can be extracted as the invention if the effect of the present invention is obtained.

As described above, according to an aspect of the present invention, music contents distributed from the EMD system can be recorded on an information storage medium so that they can be reproduced by a DVD-AR compatible reproduction apparatus.

Also, according to an aspect of the present invention, music contents distributed from the EMD system and stored in the information storage medium can be reproduced by the DVD-AR compatible reproduction apparatus to assure reproduction compatibility.

Furthermore, according to an aspect of the present invention, permission/inhibition of copy/move/delete, and the like of music contents recorded on the information storage medium can be controlled in accordance with usage rules UR simultaneously distributed from the EMD system together with the music contents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information medium configured to record, as a file, music contents which contain audio-compressed music data distributed from a music distribution system,
    wherein music data including one of linear PCM data and packed PCM data obtained by transcoding the audio-compressed music data, and an original compressed audio data of the audio-compressed music data, can be stored in a single file, and
    information for applying a usage rule having the same contents as a contents usage rule appended to the music contents to the transcoded music data can be stored.

2. An information medium configured to record, as a file, music contents which contain audio-compressed music data distributed from a music distribution system,
    wherein music data including one of linear PCM data and packed PCM data obtained by transcoding the audio-compressed music data, and an original compressed audio data of the audio-compressed music data, can be stored in a single file,
    information for applying a usage rule having the same contents as a contents usage rule appended to the music contents to the transcoded music data can be stored,
    program chain reproduction control information as management information used to reproduce the music contents can be stored, and
    link information used to access the transcoded music data can be stored in the program chain reproduction control information.

3. A medium according to claim 2, wherein the link information is recorded as a file name.

4. A medium according to claim 2, wherein the program chain reproduction control information contains one or more pieces of program information, and the link information is stored in each program information.

5. A medium according to claim 2, wherein the program chain reproduction control information contains one or more pieces of cell information each serving as a reproduction unit, and the link information is stored in each cell information.

6. A method of reading writing data from/to an information medium configured to record, as a file, music contents which contain audio-compressed music data distributed from a music distribution system comprising:
    transcoding the audio-compressed music data into one of non-compressed music data and lossless-compressed music data;
    storing the one of transcoded non-compressed music data and lossless-compressed music data and an original compressed music data of the audio-compressed music data in a single file; and
    copying a usage rule having the same contents as a contents usage rule appended to the music contents, and applying the copied usage rule to the non-compressed music data or lossless-compressed music data.

7. A method of reading/writing data from/to an information medium configured to record, as a file, music contents which contain audio-compressed music data distributed from a music distribution system, comprising:
    transcoding the audio-compressed music data into one of non-compressed music data and lossless-compressed music data;
    storing the one of transcoded non-compressed music data and lossless-compressed music data and an original compressed music data of the audio-compressed music data in a single file;
    copying a usage rule having the same contents as a contents usage rule appended to the music contents, and applying the copied usage rule to the non-compressed music data or lossless-compressed music data; and
    generating program chain control information as management information used to reproduce the music contents.

8. A reproduction method of reading out data from an information medium that records as a file music contents which contain audio-compressed music data distributed from a music distribution system, comprising:
    reading out information of the audio-compressed music data, and one of non-compressed music data and lossless-compressed music data obtained by transcoding the audio-compressed music data from the information medium;
    checking if an audio compression scheme of the read out audio-compressed music data is supported; and
    reproducing one of the one of non-compressed music data and lossless-compressed music data of the music contents read out from the information medium, and the audio-compressed music data read out from the information medium, in accordance with the checking result.

9. A reproduction method of reading out data from an information medium that records as a file music contents which contain audio-compressed music data distributed from a music distribution system, and one of non-compressed music data and lossless-compressed music data obtained by transcoding the audio-compressed music data, comprising:

reading out management information containing program chain reproduction control information used to reproduce the music contents;

accessing the music contents to be reproduced using link information which is contained in the program chain reproduction control information and is used to access the transcoded non-compressed music data or lossless-compressed music data;

reading out information of the audio-compressed music data and the one of non-compressed music data and lossless-compressed music data obtained by transcoding the audio-compressed music data from the information medium;

checking if an audio compression scheme of the read out audio-compressed music data is supported; and reproducing one of the non-compressed music data or lossless-compressed music data of the music contents read out from the information medium, and the audio-compressed music data read out from the information medium, in accordance with the checking result.

10. A reproduction control method of reading/writing data from/to an information medium which records as a music contents file audio-compressed music data distributed from a music distribution system, one of non-compressed music data and lossless-compressed music data generated by transcoding the audio-compressed music data, and a usage rule of these music data, comprising;

reading out the usage rule of the music contents file from the information medium;

checking the usage rule to determine if reproduction is permitted;

interrupting, if it is determined that reproduction is inhibited, a reproduction process; and deleting the music contents file together with the non-compressed music data or lossless-compressed music data generated by transcoding.

11. A method according to claim 10, wherein the usage rule includes at least one of a reproduction valid date and allowable reproduction count.

12. A method according to claim 11, further comprising
decrementing the allowable reproduction count by 1 if it is determined in the usage rule checking that reproduction is permitted.

13. A copy control method of reading/writing data from/to an information medium which records as a music contents file audio-compressed music data distributed from a music distribution system, one of non-compressed music data and lossless-compressed music data generated by transcoding the audio-compressed music data, and a usage rule of these music data comprising:

reading out the usage rule of the music contents file from the information medium;

checking the usage rule to determine if copy is permitted;

executing, if it is determined that copy is inhibited and if it is requested to move the music contents to another information medium, copy of the music contents, and then erasing the music contents file as a copy source; and interrupting, if it is determined that copy is inhibited and if it is not requested to move the music contents to another information medium, a copy process.

14. A method according to claim 13, wherein the usage rule includes at least one of information of permission/inhibition of copy and an allowable copy count.

15. A method according to claim 14, further comprising
decrementing the allowable copy count by 1 if it is determined in the usage rule checking that copy is permitted, and if the allowable copy count is set other than zero.

16. A move control method of reading/writing data from/to an information medium which records as a music contents file audio-compressed music data distributed from a music distribution system, one of non-compressed music data and lossless-compressed music data generated by transcoding the audio-compressed music data, and a usage rule of these music data, comprising:

upon moving the music contents to another information medium, extracting only original music contents distributed from the music distribution system in the music contents file as an original file;

copying the extracted original file to the other information medium; and erasing the music contents file from the information medium after the extracted original file copying.

17. An information recording and reproducing system for recording audio data to an information medium configured to record, as a file, music contents which contain audio-compressed music data distributed from a music distribution system, wherein music data including one of linear PCM data and packed PCM data obtained by transcoding the audio-compressed music data, and an original compressed audio data of the audio-compressed music data, can be stored in a single file, and information for applying a usage rule having the same contents as a contents usage rule appended to the music contents to the transcoded music data can be stored, the information recording and reproducing system comprising:

means for recording said transcoded music data to the information medium; and means for recording said information for applying the usage rule to the information medium.

18. An information recording and reproducing system for recording audio data to an information medium configured to record, as a file, music contents which contain audio-compressed music data distributed from a music distribution system, wherein music data including one of linear PCM data and packed PCM data obtained by transcoding the audio-compressed music data, and an original compressed audio data of the audio-compressed music data, can be stored in a single file, information for applying a usage rule having the same contents as a contents usage rule appended to the music contents to the transcoded music data can be stored, program chain reproduction control information as management information used to reproduce the music contents can be stored, and link information used to access the transcoded music data can be stored in the program chain reproduction control information, the information recording and reproducing system comprising:

means for recording said transcoded music data to the information medium; and means for recording said information for applying the usage rule to the information medium.

* * * * *